US008453820B2

(12) United States Patent
Hallowell et al.

(10) Patent No.: US 8,453,820 B2
(45) Date of Patent: Jun. 4, 2013

(54) CURRENCY HANDLING SYSTEM HAVING MULTIPLE OUTPUT RECEPTACLES INTERFACED WITH ONE OR MORE CASH PROCESSING DEVICES

(75) Inventors: Curtis W. Hallowell, Palatine, IL (US); Robert J. Klein, Chicago, IL (US)

(73) Assignee: Cummins-Allison Corp., Mt. Prospect, IL (US)

(*) Notice: Subject to any disclaimer, the term of this patent is extended or adjusted under 35 U.S.C. 154(b) by 1414 days.

(21) Appl. No.: 10/256,818

(22) Filed: Sep. 27, 2002

(65) Prior Publication Data

US 2003/0062242 A1 Apr. 3, 2003

Related U.S. Application Data

(60) Provisional application No. 60/325,566, filed on Sep. 28, 2001.

(51) Int. Cl.

| | |
|---|---|
| ***G07F 7/04*** | (2006.01) |
| ***G06K 7/00*** | (2006.01) |
| ***G06K 9/00*** | (2006.01) |
| ***G07D 7/00*** | (2006.01) |

(52) U.S. Cl.
USPC .......... 194/207; 194/206

(58) Field of Classification Search
USPC .......... 194/206, 207; 209/534
See application file for complete search history.

(56) References Cited

U.S. PATENT DOCUMENTS

| | | | | |
|---|---|---|---|---|
| 4,025,420 A | | 5/1977 | Horino | 209/74 |
| 4,733,765 A | * | 3/1988 | Watanabe | 194/206 |
| 4,787,518 A | | 11/1988 | Yuge et al. | 209/534 |
| 5,163,672 A | | 11/1992 | Mennie | 271/187 |
| 5,207,788 A | | 5/1993 | Geib | 271/122 |
| 5,295,196 A | | 3/1994 | Raterman et al. | 382/135 |
| 5,420,406 A | * | 5/1995 | Izawa et al. | 235/379 |
| 5,467,405 A | | 11/1995 | Raterman et al. | 382/135 |
| 5,467,406 A | | 11/1995 | Graves et al. | 382/135 |
| D369,984 S | | 5/1996 | Larsen | D10/97 |
| 5,633,949 A | | 5/1997 | Graves et al. | 382/135 |
| 5,640,463 A | | 6/1997 | Csulits | 382/135 |
| 5,652,802 A | | 7/1997 | Graves et al. | 382/135 |
| 5,687,963 A | | 11/1997 | Mennie | 271/119 |
| 5,692,067 A | | 11/1997 | Raterman et al. | 382/135 |
| 5,704,491 A | | 1/1998 | Graves | 209/534 |
| 5,724,438 A | | 3/1998 | Graves | 382/135 |

(Continued)

FOREIGN PATENT DOCUMENTS

| | | | |
|---|---|---|---|
| JP | 6114557 | * | 4/1986 |
| WO | WO 91/11778 | | 8/1991 |

(Continued)

OTHER PUBLICATIONS

PCT International Search Report for International Application No. PCT/US02/30788, dated Dec. 26, 2002 (3 pages).

(Continued)

*Primary Examiner* — Jeffrey Shapiro
(74) *Attorney, Agent, or Firm* — Nixon Peabody LLP

(57) ABSTRACT

A currency processing system comprises a first currency bill processing device having a plurality of output receptacles and a second currency bill processing device having at least one output receptacle. The second currency bill processing device is communicatively interfaced with the first currency bill processing device.

32 Claims, 30 Drawing Sheets

U.S. PATENT DOCUMENTS

| | | | | |
|---|---|---|---|---|
| 5,751,840 | A | 5/1998 | Raterman et al. | 382/135 |
| 5,790,693 | A | 8/1998 | Graves et al. | 382/135 |
| 5,790,697 | A * | 8/1998 | Munro et al. | 382/135 |
| 5,806,650 | A | 9/1998 | Mennie et al. | 194/206 |
| 5,815,592 | A | 9/1998 | Mennie et al. | 382/135 |
| 5,819,901 | A | 10/1998 | Filiberti | 194/202 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,909,794 | A * | 6/1999 | Molbak et al. | 194/216 |
| 5,912,982 | A | 6/1999 | Munro et al. | 382/135 |
| 5,918,720 | A * | 7/1999 | Robinson et al. | 194/206 |
| 5,938,044 | A | 8/1999 | Weggesser | 209/534 |
| 5,943,655 | A | 8/1999 | Jacobsen | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,021,883 | A | 2/2000 | Casanova et al. | 194/217 |
| 6,028,951 | A | 2/2000 | Raterman et al. | 382/135 |
| 6,039,164 | A * | 3/2000 | Waters et al. | 194/206 |
| 6,047,807 | A | 4/2000 | Molbak | 194/217 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,125,988 | A | 10/2000 | Waters | 194/217 |
| 6,128,402 | A | 10/2000 | Jones et al. | 382/135 |
| 6,155,398 | A | 12/2000 | Sagady | 194/200 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,296,101 | B1 | 10/2001 | Hasegawa et al. | 194/217 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,390,269 | B1 * | 5/2002 | Billington et al. | 194/217 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 6,493,461 | B1 | 12/2002 | Mennie et al. | 382/135 |
| 6,507,769 | B2 * | 1/2003 | Urata et al. | 700/223 |
| 6,539,104 | B1 | 3/2003 | Raterman et al. | 382/135 |
| 6,560,355 | B2 | 5/2003 | Graves et al. | 382/135 |
| 6,588,569 | B1 | 7/2003 | Jenrick et al. | 194/206 |
| 6,601,687 | B1 | 8/2003 | Jenrick et al. | 194/206 |
| 6,603,872 | B2 | 8/2003 | Jones et al. | 382/135 |
| 6,621,919 | B2 | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,640,156 | B1 * | 10/2003 | Brooks et al. | 700/213 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,659,340 | B2 * | 12/2003 | Siemens | 235/379 |
| 6,661,910 | B2 | 12/2003 | Jones et al. | 382/135 |
| 6,665,431 | B2 | 12/2003 | Jones et al. | 382/135 |
| 6,678,401 | B2 | 1/2004 | Jones et al. | 382/135 |
| 6,678,402 | B2 | 1/2004 | Jones et al. | 382/135 |
| 6,705,470 | B2 | 3/2004 | Klein et al. | 209/534 |
| 6,721,442 | B1 | 4/2004 | Mennie et al. | 382/135 |
| 6,724,926 | B2 | 4/2004 | Jones et al. | 382/135 |
| 6,724,927 | B2 | 4/2004 | Jones et al. | 382/135 |
| 6,731,785 | B1 | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Jones et al. | 382/135 |
| 6,798,899 | B2 | 9/2004 | Mennie et al. | 382/135 |
| 6,810,137 | B2 | 10/2004 | Jones et al. | 382/135 |
| 6,843,418 | B2 | 1/2005 | Jones et al. | 235/462.01 |
| 6,860,375 | B2 | 3/2005 | Hallowell et al. | 194/328 |
| 6,866,134 | B2 | 3/2005 | Stromme et al. | 194/207 |
| 6,868,954 | B2 | 3/2005 | Stromme et al. | 194/207 |
| 6,880,692 | B1 | 4/2005 | Mazur et al. | 194/207 |
| 6,913,130 | B1 | 7/2005 | Mazur et al. | 194/207 |
| 6,913,260 | B2 | 7/2005 | Maier et al. | 271/265.04 |
| 6,915,893 | B2 | 7/2005 | Mennie | 194/207 |
| 6,929,109 | B1 | 8/2005 | Klein et al. | 194/206 |
| 6,955,253 | B1 | 10/2005 | Mazur et al. | 194/207 |
| 6,955,263 | B2 | 10/2005 | Steinkogler et al. | 209/534 |
| 6,957,733 | B2 | 10/2005 | Mazur et al. | 194/215 |
| 6,959,800 | B1 | 11/2005 | Mazur et al. | 194/207 |
| 6,962,247 | B2 | 11/2005 | Maier et al. | 194/207 |
| 6,980,684 | B1 | 12/2005 | Munro et al. | 382/135 |
| 6,994,200 | B2 | 2/2006 | Jenrick et al. | 194/206 |
| 6,996,263 | B2 | 2/2006 | Jones et al. | 382/135 |
| 7,000,828 | B2 | 2/2006 | Jones | 235/379 |
| 7,016,767 | B2 | 3/2006 | Jones et al. | 700/224 |
| 7,082,216 | B2 | 7/2006 | Jones et al. | 382/137 |
| 7,092,560 | B2 | 8/2006 | Jones et al. | 382/135 |
| 7,103,206 | B2 | 9/2006 | Graves et al. | 382/135 |
| 7,103,438 | B2 | 9/2006 | Hallowell et al. | 700/116 |
| 7,146,245 | B2 | 12/2006 | Jones et al. | 700/224 |
| 7,149,336 | B2 | 12/2006 | Jones et al. | 382/135 |
| 7,158,662 | B2 | 1/2007 | Chiles | 382/135 |
| 7,171,032 | B2 | 1/2007 | Jones et al. | 382/135 |
| 7,187,795 | B2 | 3/2007 | Jones et al. | 382/135 |
| 7,191,657 | B2 | 3/2007 | Maier et al. | 73/587 |
| 7,197,173 | B2 | 3/2007 | Jones et al. | 382/135 |
| 7,200,255 | B2 | 4/2007 | Jones et al. | 382/135 |
| 7,201,320 | B2 | 4/2007 | Csulits et al. | 235/462.01 |
| 7,232,024 | B2 | 6/2007 | Mazur et al. | 194/207 |
| 7,248,731 | B2 | 7/2007 | Raterman et al. | 382/135 |
| 7,256,874 | B2 | 8/2007 | Csulits et al. | 356/71 |
| 7,269,279 | B2 | 9/2007 | Chiles | 382/135 |
| 2001/0006557 | A1 | 7/2001 | Mennie et al. | 382/135 |
| 2001/0015311 | A1 | 8/2001 | Mennie | 194/207 |
| 2001/0019624 | A1 | 9/2001 | Raterman et al. | 382/135 |
| 2001/0035603 | A1 | 11/2001 | Graves et al. | 271/265.01 |
| 2002/0001393 | A1 | 1/2002 | Jones et al. | 382/100 |
| 2002/0020603 | A1 | 2/2002 | Jones et al. | 194/346 |
| 2002/0056605 | A1 | 5/2002 | Mazur et al. | 194/207 |
| 2002/0085245 | A1 | 7/2002 | Mennie et al. | 358/498 |
| 2002/0085745 | A1 | 7/2002 | Jones et al. | 382/135 |
| 2002/0100660 | A1 * | 8/2002 | Stieber et al. | 194/215 |
| 2002/0103757 | A1 | 8/2002 | Jones et al. | 705/45 |
| 2002/0104785 | A1 | 8/2002 | Klein et al. | 209/534 |
| 2002/0107801 | A1 | 8/2002 | Jones et al. | 705/45 |
| 2002/0118871 | A1 | 8/2002 | Jones et al. | 382/137 |
| 2002/0122580 | A1 | 9/2002 | Jones et al. | 382/137 |
| 2002/0126885 | A1 | 9/2002 | Mennie et al. | 382/135 |
| 2002/0126886 | A1 | 9/2002 | Jones et al. | 382/135 |
| 2002/0131630 | A1 | 9/2002 | Jones et al. | 382/137 |
| 2002/0136442 | A1 | 9/2002 | Jones et al. | 382/135 |
| 2002/0145035 | A1 | 10/2002 | Jones | 235/379 |
| 2002/0154804 | A1 | 10/2002 | Jones et al. | 382/135 |
| 2002/0154805 | A1 | 10/2002 | Jones et al. | 382/135 |
| 2002/0154806 | A1 | 10/2002 | Jones et al. | 382/135 |
| 2002/0154807 | A1 | 10/2002 | Jones et al. | 382/135 |
| 2002/0154808 | A1 | 10/2002 | Jones et al. | 382/135 |
| 2002/0186876 | A1 | 12/2002 | Jones et al. | 382/135 |
| 2003/0009420 | A1 | 1/2003 | Jones | 705/39 |
| 2003/0015395 | A1 | 1/2003 | Hallowell et al. | 194/206 |
| 2003/0015396 | A1 | 1/2003 | Mennie | 194/206 |
| 2003/0059098 | A1 | 3/2003 | Jones et al. | 382/135 |
| 2003/0062242 | A1 | 4/2003 | Hallowell et al. | 194/302 |
| 2003/0081824 | A1 | 5/2003 | Mennie et al. | 382/135 |
| 2003/0108233 | A1 | 6/2003 | Raterman et al. | 382/135 |
| 2003/0121752 | A1 | 7/2003 | Stromme et al. | 194/207 |
| 2003/0121753 | A1 | 7/2003 | Stromme et al. | 194/207 |
| 2003/0132281 | A1 | 7/2003 | Jones et al. | 235/379 |
| 2003/0139994 | A1 | 7/2003 | Jones | 705/36 |
| 2003/0168308 | A1 | 9/2003 | Maier et al. | 194/207 |
| 2003/0174874 | A1 | 9/2003 | Raterman et al. | 382/135 |
| 2003/0182217 | A1 | 9/2003 | Chiles | 705/35 |

| | | | | |
|---|---|---|---|---|
| 2003/0198373 | A1 | 10/2003 | Raterman et al. | 382/135 |
| 2003/0202690 | A1 | 10/2003 | Jones et al. | 382/139 |
| 2004/0003980 | A1 | 1/2004 | Hallowell et al. | 194/206 |
| 2004/0016621 | A1 | 1/2004 | Jenrick et al. | 194/206 |
| 2004/0016797 | A1 | 1/2004 | Jones et al. | 235/379 |
| 2004/0028266 | A1 | 2/2004 | Jones et al. | 382/135 |
| 2004/0083149 | A1 | 4/2004 | Jones | 705/35 |
| 2004/0145726 | A1 | 7/2004 | Csulits et al. | 356/71 |
| 2004/0149538 | A1 | 8/2004 | Sakowski | 194/207 |
| 2004/0153408 | A1 | 8/2004 | Jones et al. | 705/43 |
| 2004/0154964 | A1 | 8/2004 | Jones | 209/534 |
| 2004/0173432 | A1 | 9/2004 | Jones | 194/216 |
| 2004/0211829 | A1 | 10/2004 | Steinkogler et al. | 100/49 |
| 2004/0251110 | A1 | 12/2004 | Jenrick et al. | 194/207 |
| 2005/0029168 | A1 | 2/2005 | Jones et al. | 209/534 |
| 2005/0035034 | A1 | 2/2005 | Long et al. | 209/534 |
| 2005/0040225 | A1 | 2/2005 | Csulits et al. | 235/379 |
| 2005/0047642 | A1 | 3/2005 | Jones et al. | 382/137 |
| 2005/0060055 | A1 | 3/2005 | Hallowell et al. | 700/95 |
| 2005/0060059 | A1 | 3/2005 | Klein et al. | 700/213 |
| 2005/0060061 | A1 | 3/2005 | Jones | 700/226 |
| 2005/0077142 | A1 | 4/2005 | Tam et al. | 194/217 |
| 2005/0086271 | A1 | 4/2005 | Jones et al. | 707/200 |
| 2005/0087422 | A1 | 4/2005 | Maier et al. | 194/207 |
| 2005/0108165 | A1 | 5/2005 | Jones et al. | 705/43 |
| 2005/0117791 | A2 | 6/2005 | Raterman et al. | 382/135 |
| 2005/0117792 | A2 | 6/2005 | Graves et al. | 382/135 |
| 2005/0150738 | A1 | 7/2005 | Hallowell et al. | 194/206 |
| 2005/0163361 | A1 | 7/2005 | Jones et al. | 382/135 |
| 2005/0163362 | A1 | 7/2005 | Jones et al. | 382/137 |
| 2005/0169511 | A1 | 8/2005 | Jones | 382/135 |
| 2005/0173221 | A1 | 8/2005 | Maier et al. | 194/207 |
| 2005/0183928 | A1 | 8/2005 | Jones et al. | 194/207 |
| 2005/0207634 | A1 | 9/2005 | Jones et al. | 382/135 |
| 2005/0213803 | A1 | 9/2005 | Mennie et al. | 382/135 |
| 2005/0241909 | A1 | 11/2005 | Mazur et al. | 194/207 |
| 2005/0249394 | A1 | 11/2005 | Jones et al. | 382/135 |
| 2005/0265591 | A1 | 12/2005 | Jones et al. | 382/135 |
| 2005/0276458 | A1 | 12/2005 | Jones et al. | 382/135 |
| 2005/0278239 | A1 | 12/2005 | Jones et al. | 705/35 |
| 2006/0010071 | A1 | 1/2006 | Jones et al. | 705/42 |
| 2006/0054455 | A1 | 3/2006 | Kuykendall et al. | 194/217 |
| 2006/0078186 | A1 | 4/2006 | Freeman et al. | 382/135 |
| 2006/0182330 | A1 | 8/2006 | Chiles | 382/135 |
| 2006/0195567 | A1 | 8/2006 | Mody et al. | 709/224 |
| 2006/0210137 | A1 | 9/2006 | Raterman et al. | 382/135 |
| 2006/0274929 | A1 | 12/2006 | Jones et al. | 382/135 |
| 2007/0076939 | A1 | 4/2007 | Jones et al. | 382/135 |
| 2007/0078560 | A1 | 4/2007 | Jones et al. | 700/224 |
| 2007/0095630 | A1 | 5/2007 | Mennie et al. | 194/206 |
| 2007/0112674 | A1 | 5/2007 | Jones et al. | 705/45 |
| 2007/0122023 | A1 | 5/2007 | Jenrick et al. | 382/135 |
| 2007/0172107 | A1 | 7/2007 | Jones et al. | 382/137 |

FOREIGN PATENT DOCUMENTS

| | | | |
|---|---|---|---|
| WO | WO 92/17394 | | 10/1992 |
| WO | WO 93/23824 | | 11/1993 |
| WO | WO 95/24691 | | 9/1995 |
| WO | WO 96/10800 | | 4/1996 |
| WO | WO 96/36933 | | 11/1996 |
| WO | WO 97/30422 | | 8/1997 |
| WO | WO 97/43734 | | 11/1997 |
| WO | WO 97/45810 | | 12/1997 |
| WO | WO 98/12662 | | 3/1998 |
| WO | WO 98/13785 | | 4/1998 |
| WO | WO 98/24052 | | 6/1998 |
| WO | WO 98/24067 | | 6/1998 |
| WO | WO 98/35323 | | 8/1998 |
| WO | WO 98/40839 | | 9/1998 |
| WO | WO 98/47100 | | 10/1998 |
| WO | WO 98/50892 | | 11/1998 |
| WO | WO 98/59323 | | 12/1998 |
| WO | WO 99/09511 | | 2/1999 |
| WO | WO 99/14668 | | 3/1999 |
| WO | WO 99/23601 | | 5/1999 |
| WO | WO 99/41695 | | 8/1999 |
| WO | WO 99/48040 | | 9/1999 |
| WO | WO 99/48042 | | 9/1999 |
| WO | WO 00/24572 | | 5/2000 |
| WO | WO 01/08108 | | 2/2001 |
| WO | WO 01/59685 | | 8/2001 |
| WO | WO 01/59723 | | 8/2001 |
| WO | WO 02/29735 | | 4/2002 |
| WO | WO 02/054360 | | 7/2002 |
| WO | WO 03/005312 | | 1/2003 |
| WO | WO 03/028361 | | 4/2003 |
| WO | WO 03/029913 | | 4/2003 |
| WO | WO 03/030113 | | 4/2003 |
| WO | WO 03/067532 | | 8/2003 |
| WO | WO 03/107282 | | 12/2003 |
| WO | WO 2004/010367 | | 1/2004 |
| WO | WO 2004/027717 | | 4/2004 |
| WO | WO 2004/036508 | | 4/2004 |
| WO | WO 2004/038631 | | 5/2004 |
| WO | WO 2004/068422 | | 8/2004 |
| WO | WO 2005/013209 | A2 | 2/2005 |
| WO | WO 2005/017842 | A1 | 2/2005 |
| WO | WO 2005/028348 | A2 | 3/2005 |
| WO | WO 2005/029240 | A2 | 3/2005 |
| WO | WO 2005/036445 | A1 | 4/2005 |
| WO | WO 2005/076229 | A1 | 8/2005 |
| WO | WO 2006/039439 | A2 | 4/2006 |
| WO | WO 2006/076289 | A2 | 7/2006 |
| WO | WO 2006/076634 | A2 | 7/2006 |

OTHER PUBLICATIONS

Cummins JetScan™ MPS Bar Coded Ticket Processing Brochure (023-1655 Rev 1), 2 pages (Sep. 2002).

* cited by examiner

CURRENCY HANDLING SYSTEM HAVING MULTIPLE OUTPUT RECEPTACLES INTERFACED WITH ONE OR MORE CASH PROCESSING DEVICES

CROSS-REFERENCE TO RELATED APPLICATIONS

The present application claims priority to U.S. Provisional Patent Application Ser. No. 60/325,566, entitled "Currency Handling System Having Multiple Output Receptacles Interfaced With One Or More Cash Processing Devices" which was filed on Sep. 28, 2001 and is incorporated herein by reference in its entirety.

FIELD OF THE INVENTION

The present invention relates generally to the field of currency handling systems and, more particularly, to a system for processing currency using a first currency bill processing device having a plurality of output receptacles and second cash processing device.

BACKGROUND OF THE INVENTION

A variety of techniques and apparatuses have been used to satisfy the requirements of automated currency handling machines. As businesses and banks grow, these businesses are experiencing a greater volume of paper currency. These businesses are continually requiring not only that their currency be processed more quickly but, also, processed with more options in a less expensive manner and in a more efficient manner.

At the upper end of sophistication in this area of technology are machines that are capable of rapidly identifying, discriminating, and counting multiple currency denominations and then sorting the currency bills into a multitude of output compartments.

Often in the of processing large quantities of currency bills, some bills are rejected and not included in the totals associated with the particular batch, sub-batch, run, etc. Bills are be rejected for a variety of reasons including for failing an authentication test, not being identified, being doubled (i.e., overlapping), or being skewed (i.e., out of alignment with the transport path). In some currency bill processing devices having a plurality of output compartments, these bills are diverted to a pre-designated output compartment often appropriately referred to as a reject compartment while the other bills continue to be processed. Often these rejected bills are then manually verified and then manually entered into the batch or sub-batch total by keying in information or amounts into an operator interface This process can be time consuming and includes the potential for errors associated with manual entry.

SUMMARY OF THE INVENTION

A currency processing system comprises a first currency bill processing device having a plurality of output receptacles and a second currency bill processing device having at least one output receptacle The second currency bill processing device is communicatively interfaced with the first currency bill processing device.

The above summary of the present invention is not intended to represent each embodiment, or every aspect, of the present invention. Additional features and benefits of the present invention will become apparent from the detail description, figures, and claims set forth below.

Figure 1A:
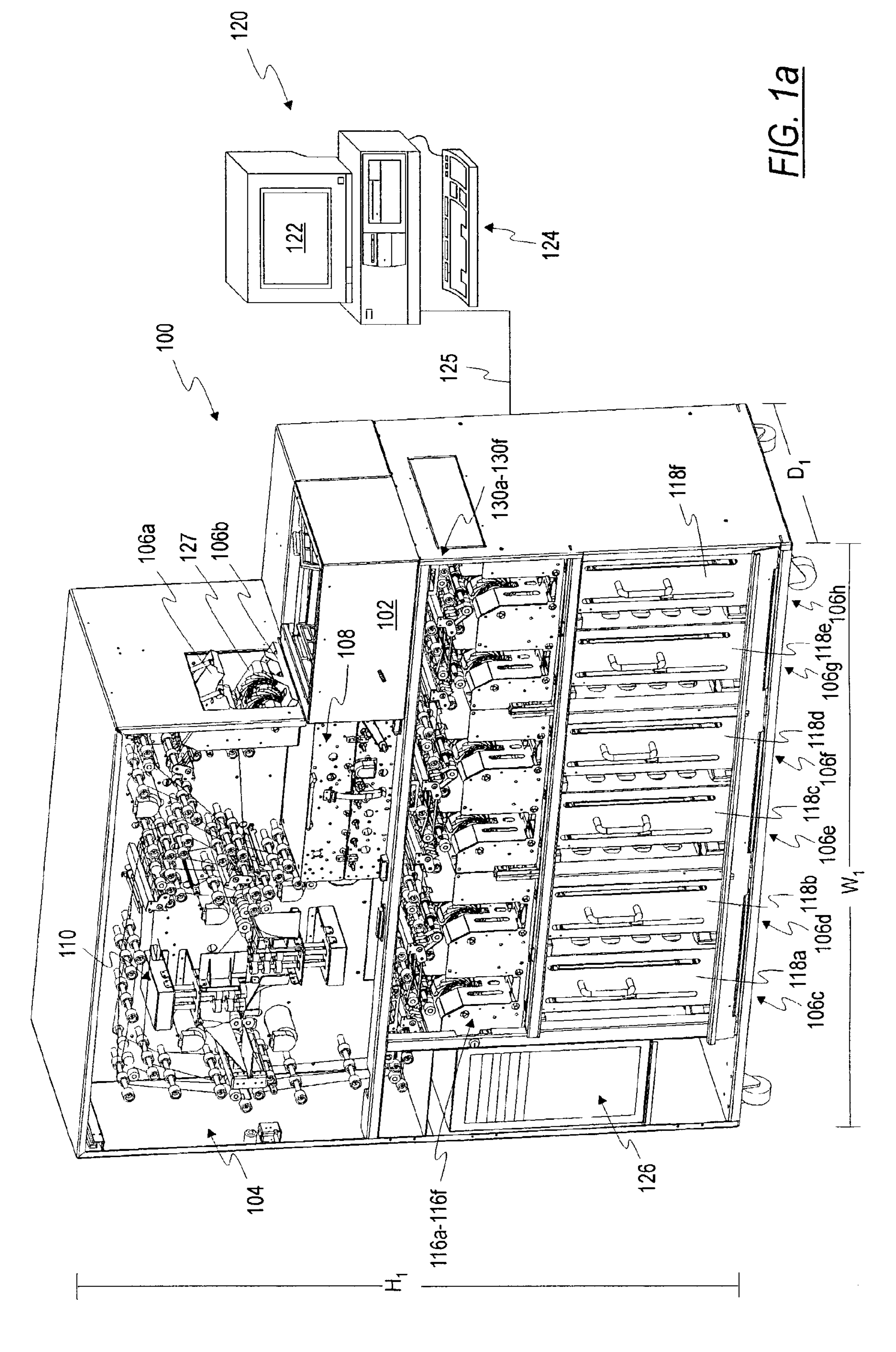
FIG. 1*a* is a perspective view of a document handling device according to one embodiment of the invention.

While the invention is susceptible to various modifications and alternative forms, specific embodiments will be shown by way of example in the drawings and will be described in detail herein It should be understood, however, that the invention is not intended to be limited to the particular forms disclosed. Rather, the invention is to cover all modifications, equivalents and alternatives falling within the spirit and scope of the invention as defined by the appended claims.

DETAILED DESCRIPTION OF THE ILLUSTRATED EMBODIMENTS

Figure 1B:
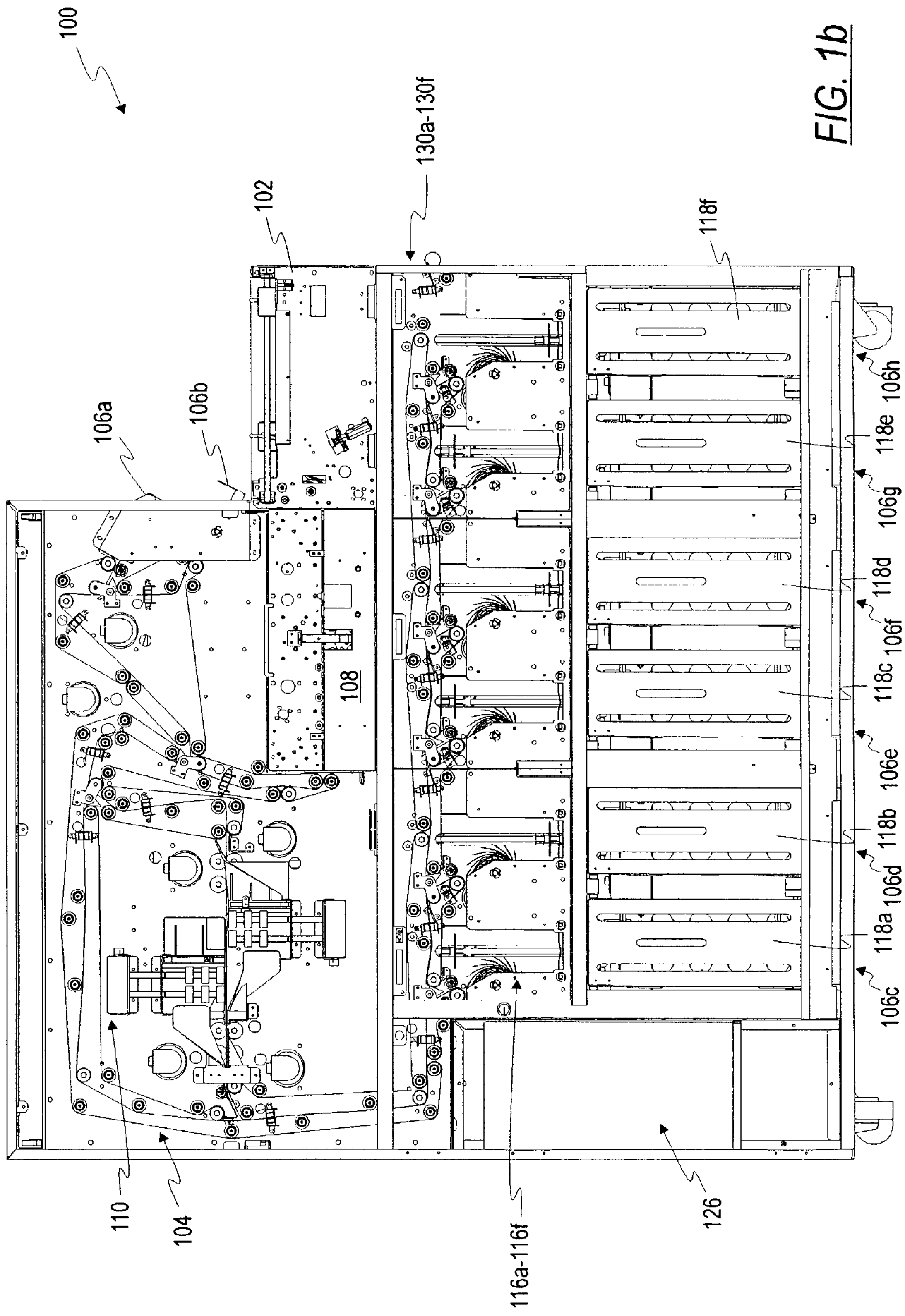
FIG. 1*b* is a front view of a document handling device according to one embodiment of the invention.

Referring to FIGS. 1*a* and 1*b*, a multi-pocket document processing device 100 such as a currency handling device according to one embodiment of the present invention is illustrated. Currency bills are fed, one by one, from a stack of currency bills placed in an input receptacle 102 into a transport mechanism 104. The transport mechanism 104 guides currency bills to one of a plurality of output receptacles 106*a*-106*h*, which may include upper output receptacles 106*a*, 106*b*, as well as lower output receptacles 106*c*-106*h*. Before reaching an output receptacle 106 the transport mechanism 104 guides the bill through an evaluation region 108 where a bill can be, for example, analyzed, authenticated, denominated, counted, and/or otherwise processed. In alternative embodiments of the currency handling device 100 of the present invention, the evaluation region 108 can determine bill orientation, bill size, or whether bills are stacked upon one another The results of the above process or processes may be used to determine to which output receptacle 106 a bill is directed. The illustrated embodiment of the currency handling device has an overall width, $W_1$, of approximately 4.52 feet (1.38 meters), a height, $H_1$, of approximately 4.75 feet (1.45 meters), and a depth, $D_1$, of approximately 1.67 feet (0.50 meters).

In one embodiment, documents such as currency bills are transported, scanned, denominated, authenticated and/or otherwise processed at a rate equal to or greater than 600 bills per minute In another embodiment, documents such as currency bills are transported, scanned, denominated, authenticated, and/or otherwise processed at a rate equal to or greater than 800 bills per minute. In another embodiment, documents such as currency bills are transported, scanned, denominated, authenticated and/or otherwise processed at a rate equal to or greater than 1000 bills per minute In still another embodiment, documents such as currency bills are transported, scanned, denominated, authenticated, and/or otherwise processed at a rate equal to or greater than 1200 bills per minute.

In the illustrated embodiment, interposed in the bill transport mechanism 104, intermediate the bill evaluation region 108 and the lower output receptacles 106*c*-106*h* is a bill facing mechanism designated generally by reference numeral 110. The bill facing mechanism is capable of rotating a bill 180° so that the face orientation of the bill is reversed. The leading edge of the bill (the wide dimension of the bill according to one embodiment) remains constant while the bill is rotated approximately 180° about an axis parallel to the smaller dimension of the bill) so that the face orientation of the bill is reversed. That is, if a U.S. bill, for example, is initially presented with the surface bearing a portrait of a president facing down, it may be directed to the facing mechanism 110, whereupon it will be rotated 180° so that the surface with the portrait faces up The decision may be taken to send a bill to the facing mechanism 110 when the selected mode of operation or other operator instructions call for maintaining a given face orientation of bills as they are processed by the currency handling device 100. Using U.S. currency as an example, it may be desirable in certain circumstances for all of the bills ultimately delivered to the lower output receptacles 106*c*-106*h* to have the bill surface bearing the portrait of the president facing up In such embodiments of the currency handling device 100, the bill evaluation region 108 is capable of determining the face orientation of a bill, such that a bill not having the desired face orientation can first be directed to the facing mechanism 110 before being delivered to the appropriate output receptacle 106. Further details of the operation and mechanical aspects a bill facing mechanism for use with the multi-pocket document processing device 100 illustrated in FIGS. 1*a* and 1*b* are disclosed in commonly owned U.S. Pat. Nos. 6,074,334 and 6,371,303, each of which is incorporated herein by reference in its entirety.

The currency handling device 100 in FIG. 1*a* may be controlled from a separate controller or control unit 120 which has a display/user-interface 122, which may incorporate a touch panel display in one embodiment of the present invention, which displays information, including "functional" keys when appropriate. The display/user-interface 122 may be a full graphics display. Alternatively, additional physical keys or buttons, such as a keyboard 124, may be employed. The control unit 120 may be a self-contained desktop or laptop computer which communicates with the currency handling device 100 via a cable 125. The currency handling device 100 may have a suitable communications port (not shown) for this purpose. In embodiments in which the control unit 120 is a desktop computer wherein the display/user-interface 122 and the desktop computer are physically separable, the desktop computer may be stored within a compartment 126 of the currency handling device 100. In other alternative embodiments, the control unit 120 is integrated into the currency handling device 100 so the control unit 120 is contained within the device 100.

The operator can control the operation of the currency handling device 100 through the control unit 120. Through the control unit 120 the operator can direct the bills into specific output receptacles 106*a*-106*h* by selecting various user defined modes. In alternative embodiments, the user can select pre-programmed user defined modes or create new user defined modes based on the particular requirements of the application For example, the operator may select a user defined mode which instructs the currency handling device 100 to sort bills by denomination, accordingly, the evaluation region 108 denominates the bills and directs one dollar bills into the first lower output receptacle 106*c*, five dollar bills into the second lower output receptacle 106*d*, ten dollar bills into the third lower output receptacle 106*e*, twenty dollar bills into the forth lower output receptacle 106*f*, fifty dollar bills into the fifth lower output receptacle 106*g*, and one-hundred dollar bills into the sixth lower output receptacle 106*h* The operator may also instruct the currency handling device 100 to deliver those bills whose denomination was not determined, "no call bills," to the first upper output receptacle 106*a*. In such an embodiment, upper output receptacle 106*a* would function as a reject pocket In an alternative embodiment, the operator may instruct the currency handling device 100 to also evaluate the authenticity of each bill In such an embodiment, authentic bills would be directed to the appropriate lower output receptacle 106*c*-106*h*. Those bills that were determined not to be authentic, "suspect bills," would be delivered to the second upper output receptacle 106*b*. A multitude of user defined modes are disclosed by U.S. Pat. No. 6,278,795, entitled "Multi-Pocket Currency Discriminator" and filed on Aug. 21, 1997, incorporated herein by reference in its entirety, which may be employed in conjunction with the present invention such as the device illustrated in FIGS. 1*a* and 1*b*.

According to one embodiment, the currency handling device 100 is designed so that when the evaluation region 108 is unable to identify certain criteria regarding a bill, the unidentified bill is flagged and "presented" in one of the output receptacles 106*a*-106*h*, that is, the transport mechanism 104 is stopped so that the unidentified bill is located at a predetermined position within one of the output receptacles 106*a*-106*h*, such as being the last bill transported to one of the output receptacles Such criteria can include denominating information, authenticating information, information indicative of the bill's series, or other information the evaluation region 108 is attempting to obtain pursuant to a mode of operation. Which output receptacles 106*a*-106*h* the flagged bill is presented in may be determined by the user according to a selected mode of operation. For example, where the unidentified bill is the last bill transported to an output receptacle 106*a*-106*h*, it may be positioned within a stacker wheel or positioned at the top of the bills already within the output receptacle 106*a*-106*h* While unidentified bills may be transported to any output receptacles 106*a*-106*h*, it may be more convenient for the operator to have unidentified bills transported to one of the upper output receptacles 106*a,b* where the operator is able to easily see and/or inspect the bill which has not been identified by the evaluation region 108. The operator may then either visually inspect the flagged bill while it is resting on the top of the stack, or alternatively, the operator may decide to remove the bill from the output receptacle 106 in order to examine the flagged bill more closely. In an alternative embodiment of the currency handling device 100, the device 100 may communicate to the user via the display/user-interface 122 in which one of the output receptacles 106*a*-106*h* a flagged bill is presented.

The currency handling device 100 may be designed to continue operation automatically when a flagged bill is removed from the upper output receptacle 106*a,b* or, according to one embodiment of the present invention, the device 100 may be designed to suspend operation and require input from the user via the control unit 120. Upon examination of a flagged bill by the operator, it may be found that the flagged bill is genuine even though it was not identified as so by the evaluation region 108 or the evaluation region 108 may have been unable to denominate the flagged bill. However, because the bill was not identified, the total value and/or denomination counters will not reflect its value. According to one embodiment, such an unidentified bill is removed from the output receptacles 106 and reprocessed or set aside. According to another embodiment, the flagged bills may accumulate in the upper output receptacles 106*a,b* until the batch of currency bills currently being processed is completed or the output receptacle 106*a,b* is full and then reprocessed or set aside.

According to another embodiment, when a bill is flagged, the transport mechanism may be stopped before the flagged bill is transported to one of the output receptacles Such an embodiment is particularly suited for situations in which the operator need not examine the bill being flagged; for example, the currency handling device 100 is instructed to first process United States currency and then British currency pursuant to a selected mode of operation where the currency handling device 100 processes United States $1, $5, $10, $20, $50, and $100 currency bills into the lower output receptacles 106*c*-106*h*, respectively Upon detection of the first British pound note, the currency handling device 100 may halt operation allowing the operator to empty the lower output receptacles 106*c*-106*h* and to make any spatial adjustments necessary to accommodate the British currency. A multitude of modes of operation are described in conjunction with bill flagging, presenting, and/or transport halting in U.S. Pat. No. 6,278,795, entitled "Method and Apparatus for Document Processing" and filed on May 28, 1997, incorporated herein by reference in its entirety above, which may be employed in conjunction with the present invention such as the device illustrated in FIGS. 1*a* and 1*b*.

In the illustrated embodiment, with regard to the upper output receptacles 106*a*, 106*b*, the second upper output receptacle 106*b* is provided with a stacker wheel 127 for accumulating a number of bills, while the first upper output receptacle 106*a* is not provided with such a stacker wheel Thus, when pursuant to a preprogrammed mode of operation or an operator selected mode or other operator instructions, a bill is to be fed to the first upper output receptacle 106*a*, there may be a further instruction to momentarily suspend operation of the currency handling device 100 for the operator to inspect and remove the bill On the other hand, it may be possible to allow a small number of bills to accumulate in the first upper output receptacle 106*a* prior to suspending operation. Similarly, the second upper output receptacle 106*b* may be utilized initially as an additional one of the lower output receptacles 106*c*-106*h*. However, there is no storage cassette associated with the second upper output receptacle 106*b* Therefore, when the second upper output receptacle 106*b* is full, operation may be suspended to remove the bills at such, time as yet further bills are directed to the second upper output receptacle 106*b* in accordance with the selected mode of operation or other operator instructions. In an alternative embodiment of the currency handling device 100 both the first and the second upper output receptacles 106*a*, 106*b* are equipped with a stacker wheel In such an embodiment both the upper output receptacles **106*a,b* may also function as the lower output receptacle 106*c*-106*h*** allowing a number of bills to be stacked therein.

Figure 2A:
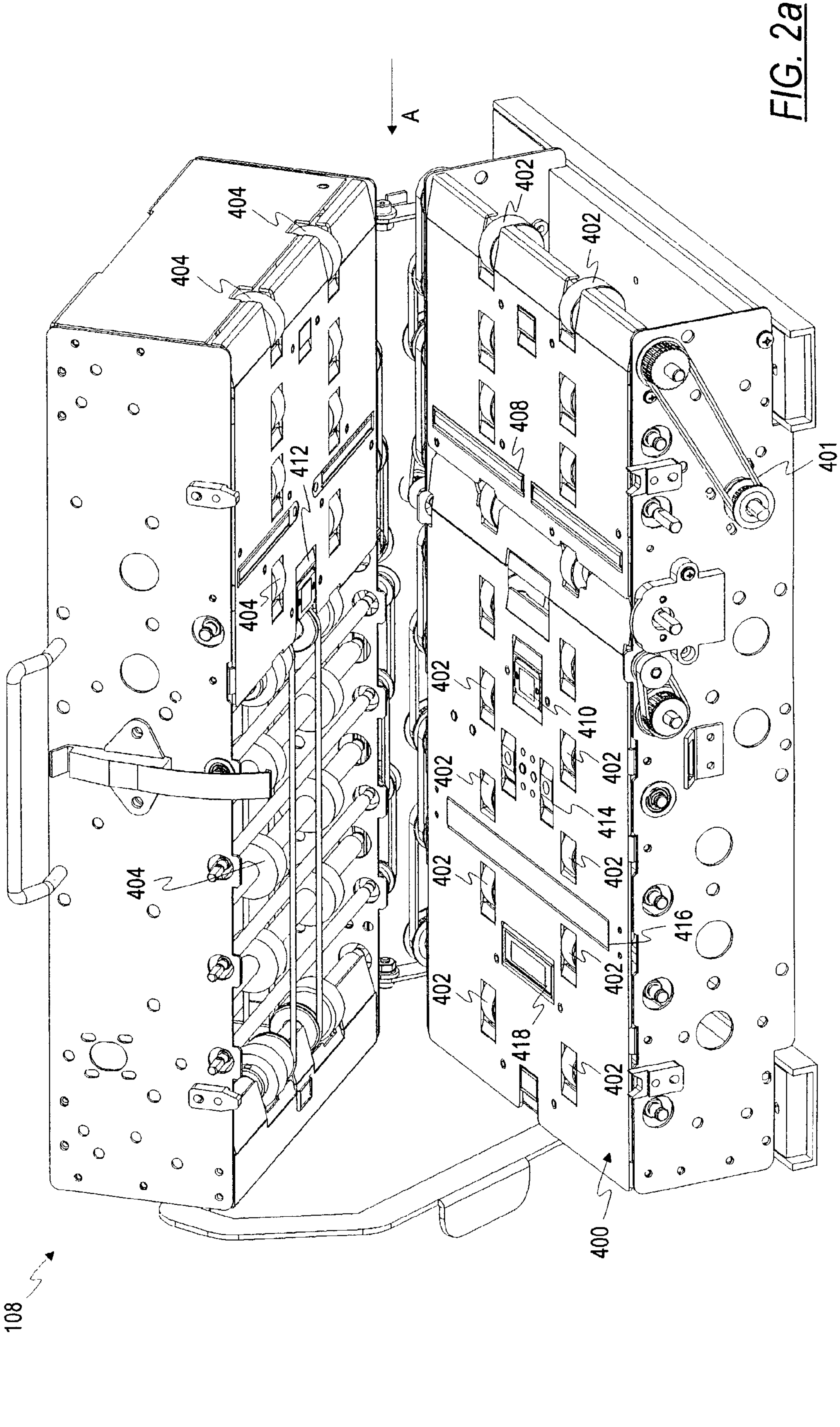
FIG. 2*a* is a perspective view of an evaluation region according to one embodiment of the document handling device of the present invention.
Figure 2B:
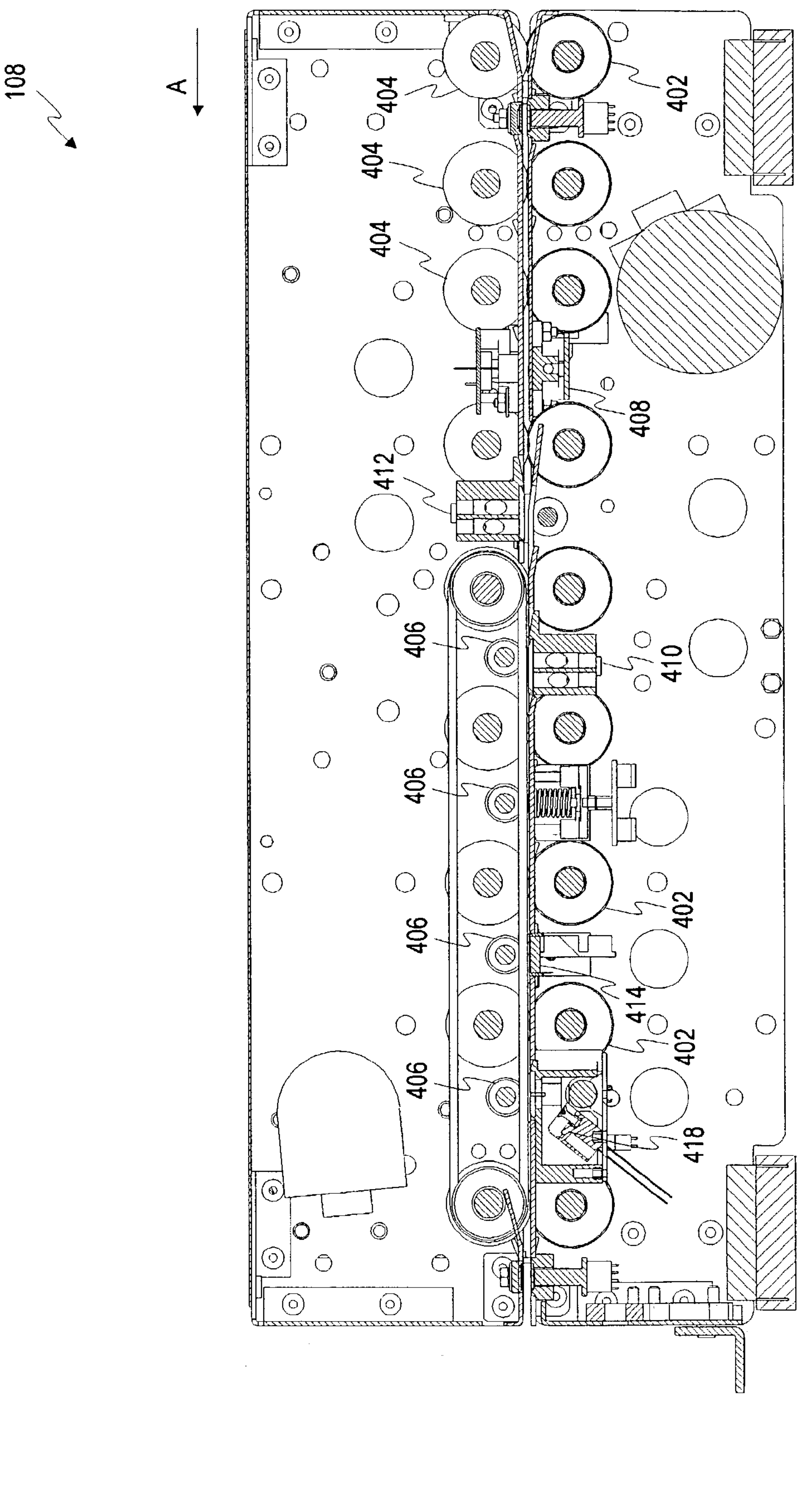
FIG. 2*b* is a side view of an evaluation region according to one embodiment of the document handling device of the present invention.
Figure 3A:
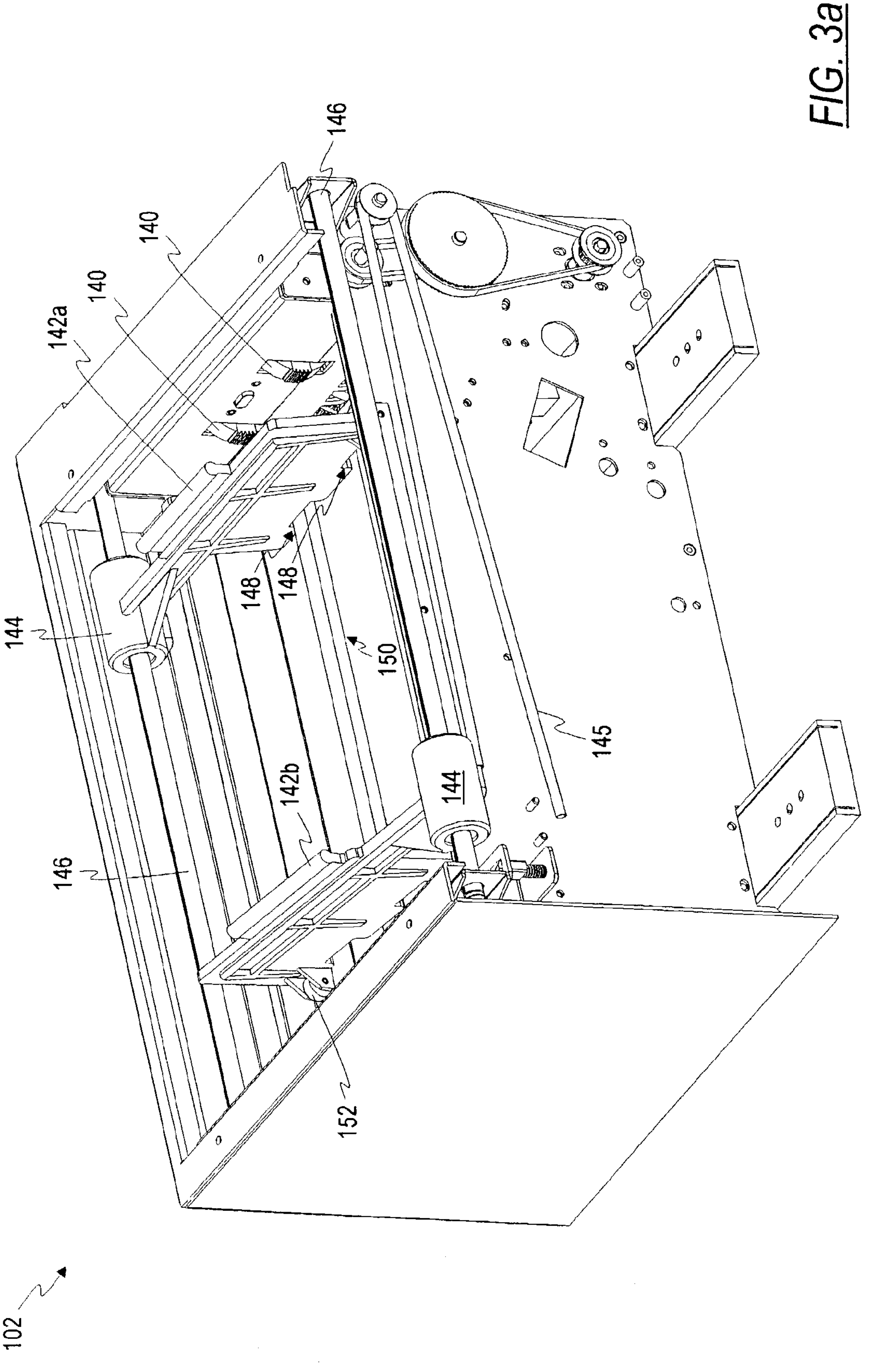
FIG. 3*a* is a perspective view of an input receptacle according to one embodiment of the document handling device of the present invention.
Figure 3B:
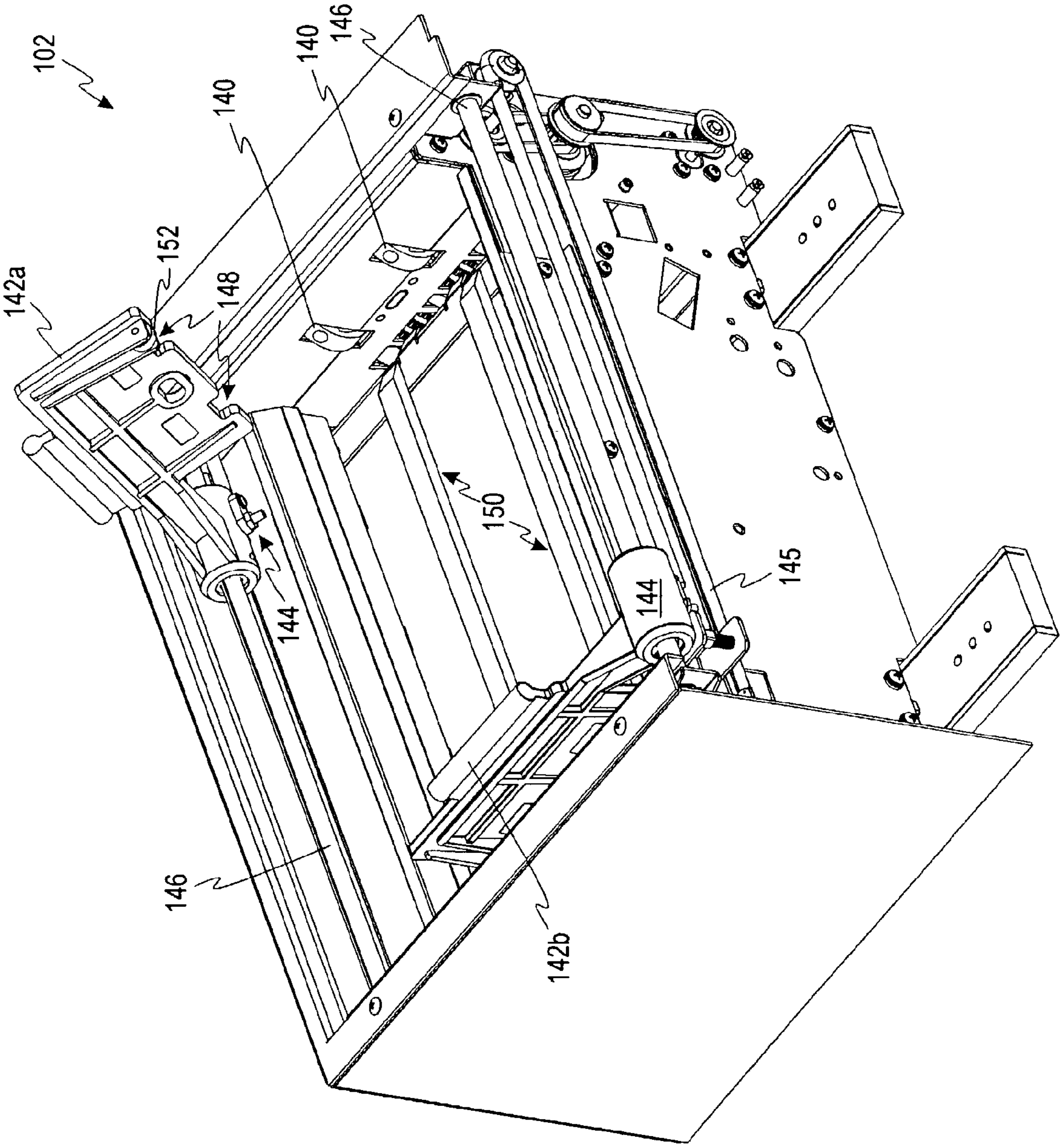
FIG. 3*b* is another perspective view of an input receptacle according to one embodiment of the document handling device of the present invention.
Figure 3C:
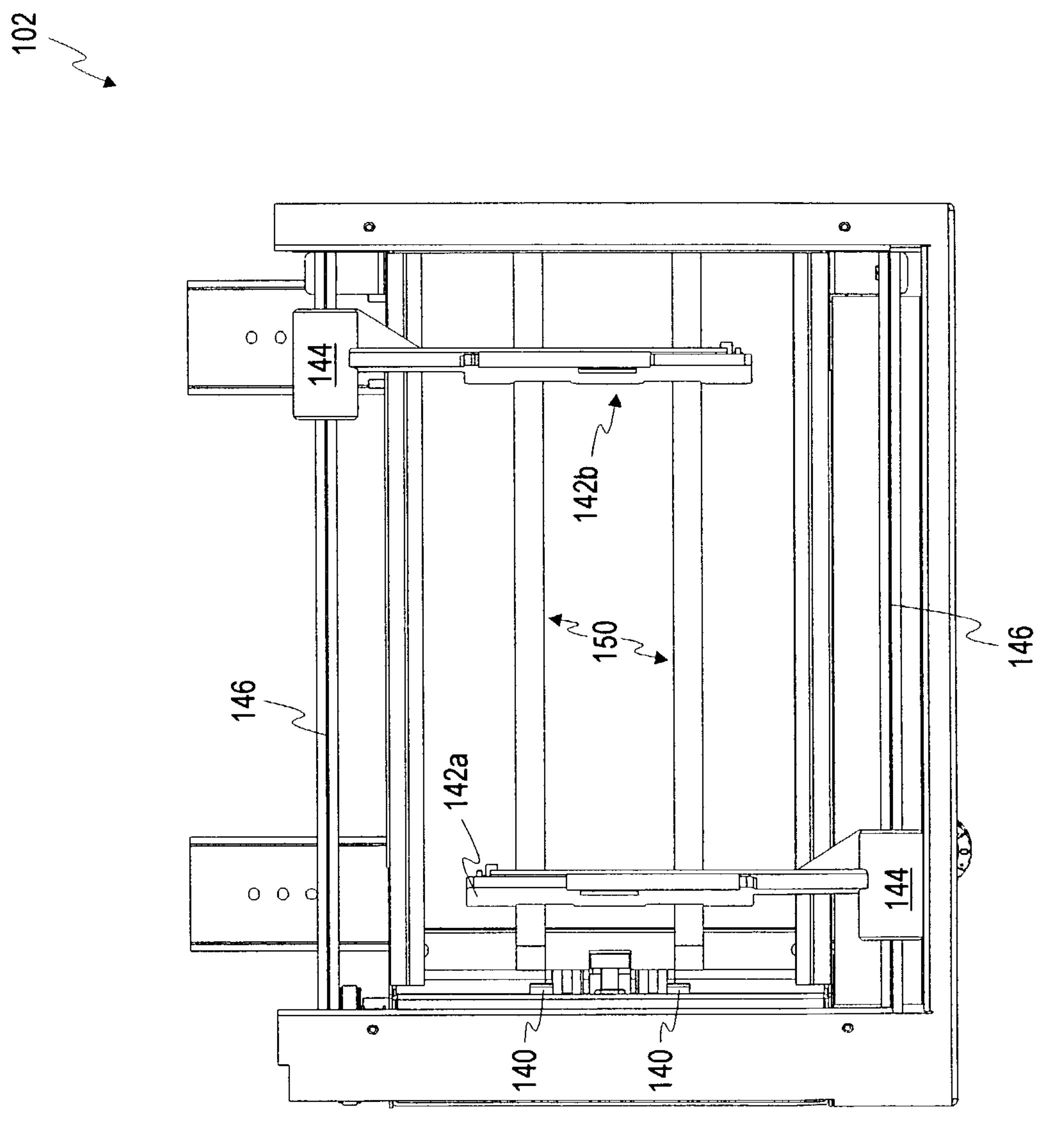
FIG. 3*c* is a top view of an input receptacle according to one embodiment of the document handling device of the present invention.
Figure 3D:
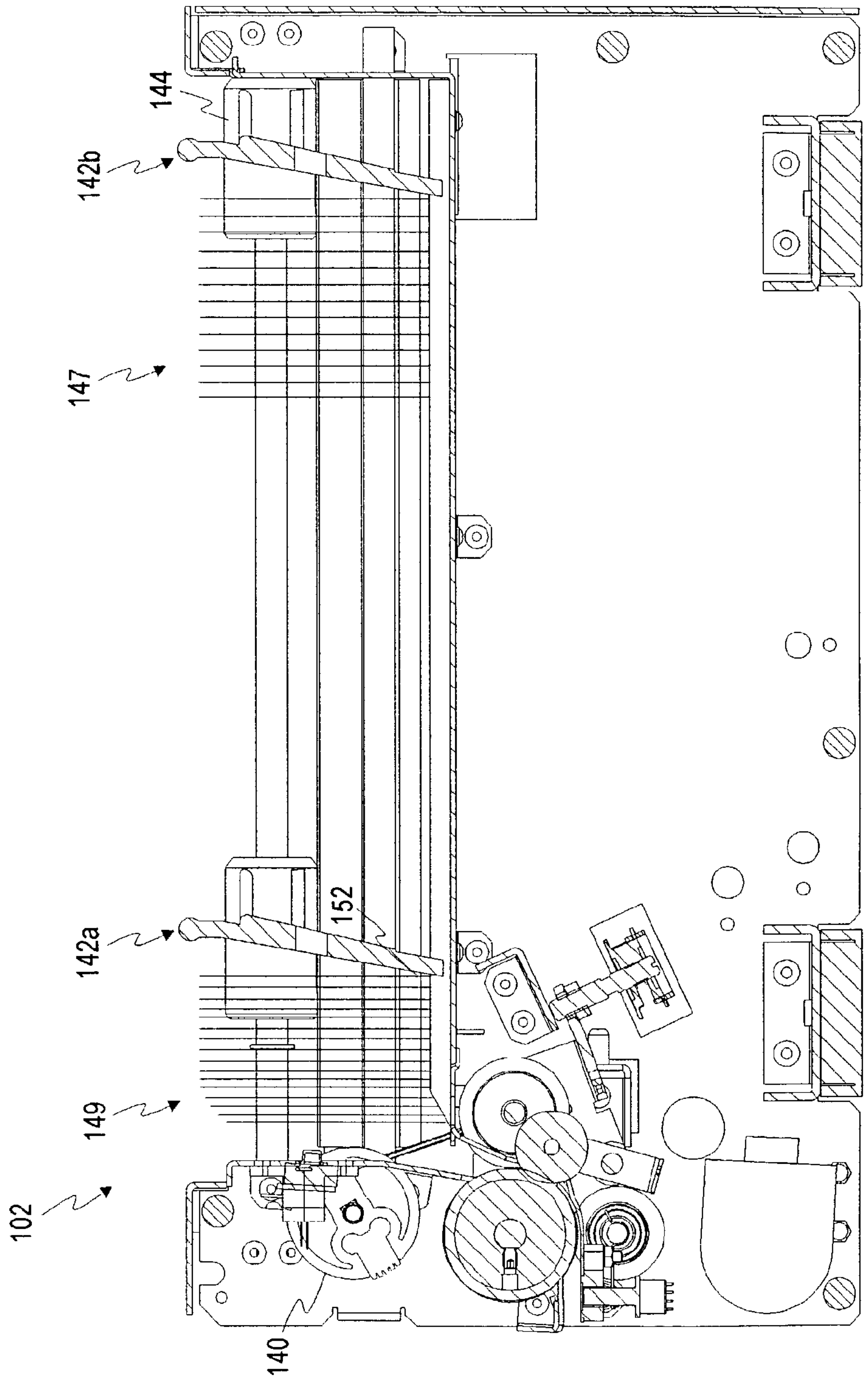
FIG. 3*d* is a side view of an input receptacle according to one embodiment of the document handling device of the present invention.

FIGS. **2*a* and 2*b* illustrate the evaluation region 108 according to one embodiment of the currency handling system 100. The evaluation region can be opened for service, access to sensors, clear bill jams, etc. as shown in FIG. 2*a*. The characteristics of the evaluation region 108 may vary according to the particular application and needs of the user. The evaluation region 108 can accommodate a number and variety of different types of sensors depending on a number of variables. These variables are related to whether the machine is authenticating, counting, or discriminating denominations and what distinguishing characteristics are being examined, e.g. size, thickness, color, magnetism, reflectivity, absorbabilty, transmissivity, electrical conductivity, etc The evaluation region 108 may employ a variety of detection means including, but not limited to, a size detection and density sensor 408, a lower 410 and an upper 412 optical scan head, a single or multitude of magnetic sensors 414, a thread sensor 416, and an ultraviolet/fluorescent light scan head 418**. These detection means and a host of others are disclosed in commonly owned, co-pending U.S. Pat. No. 6,278,795, incorporated by reference above.

The direction of bill travel through the evaluation region 108 is indicated by arrow A. The bills are positively driven along a transport plate 400 through the evaluation region 108 by means of a transport roll arrangement comprising both driven rollers 402 and passive rollers 404. The rollers 402 are driven by a motor (not shown) via a belt 401. Passive rollers 404 are mounted in such a manner as to be freewheeling about their respective axis and biased into counter-rotating contact with the corresponding driven rollers 402. The driven and passive rollers 402, 404 are mounted so that they are substantially coplanar with the transport plate 400. The transport roll arrangement also includes compressible rollers 406 to aid in maintaining the bills flat against the transport plate 400. Maintaining the bills flat against the transport plate 400 so that the bills lie flat when transported past the sensors enhances the overall reliability of the evaluation processes. A similar transport arrangement is disclosed in commonly-owned U.S. Pat. No. 5,687,963 entitled “Method and Apparatus for Discriminating and Counting Documents,” which is incorporated herein by reference in its entirety.

Referring now to FIGS. **3*a*-3*d*, the input receptacle 102 of the currency handling device 100 is illustrated. A feeder mechanism such as a pair of stripping wheels 140 aid in feeding the bills in seriatim to the transport mechanism 104 which first carries the bills through the evaluation region 108. According to one embodiment, the input receptacle 102 includes at least one spring-loaded feeder paddle 142*a* which is pivotally mounted, permitting it to be pivoted upward and drawn back to the rear of a stack of bills placed in the input receptacle 102 so as to bias the bills towards the evaluation region 108 via the pair of stripping wheels 140. The paddle 142*a* is coupled to an advance mechanism 144 to urge the paddle 142*a* towards the stripping wheels 140. In the illustrated embodiment, motion is imparted to the advance mechanism via a spring 145. In other alternative embodiments, the advance mechanism 144 is motor driven. The advance mechanism 144 is slidably mounted to a shaft 146. The advance mechanism 144 also constrains the paddle 142*a* to a linear path The advance mechanism 144 may contain a liner bearing (not shown) allowing the paddle 142*a* to easily slide along the shaft 146. In the embodiment illustrated, the paddle 142*a* may also contain channels 148 to aid in constraining the paddle 142*a* to a linear path along a pair of tracks 150. The paddle 142*a* may additionally include a roller 152 to facilitate the movement of the paddle 142*a***.

In the embodiment illustrated in FIGS. **3*a*-3*d*, a second paddle 142*b* is provided such that a second stack of bills 147 may be placed in the input receptacle 102 behind a first group of bills 149, while the first group of bills 149 is being fed into the currency handling device 100. Thus, the two feeder paddles 142*a* and 142*b* may be alternated during processing in order to permit multiple stacks of currency bills to be loaded into the input receptacle 102. In such an embodiment, the operator would retract paddle 142*a* and place a stack of bills into the input receptacle Once inside the input receptacle, the operator places the paddle 142*a* against the stack of bills so that the paddle 142*a* biases the stack of bills towards the pair of stripper wheels 140. The operator then loads a second stack of bills into the input receptacle 102 by retracting the second paddle 142*b* and placing a stack of bills in the input receptacle between the paddles 142*a* and 142*b*. The second paddle 142*b* urges the second stack of bills up against the backside of the first paddle 142*a*. The operator upwardly rotates the first paddle 142*a* thus combining the two stacks. The first paddle 142*a* is then retracted to the rear of the input receptacle and the process can be repeated The two paddle input receptacle allows the operator to more easily continuously feed stacks of bills to the currency handling device 100**. In devices not having two feeder paddles, the operator is forced to awkwardly manipulate the two stacks of bills and the advance mechanism Alternatively, the operator may wait for the stack of bills to be processed out of the input receptacle to add another stack; however, waiting to reload until each stack is processed adds to the total time to process a given amount of currency.

Figure 4:
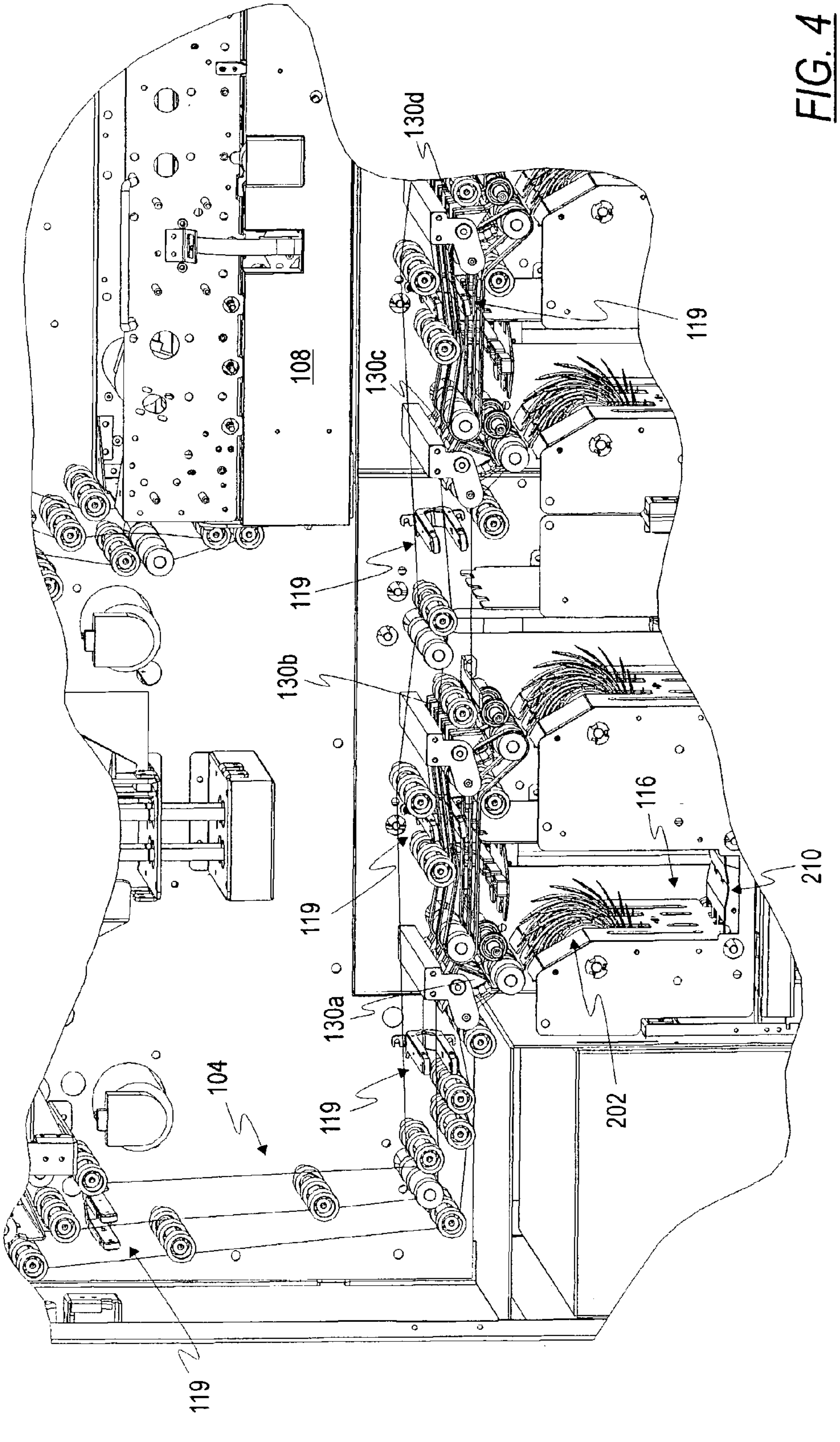
FIG. 4 is a perspective view of a portion of a transportation mechanism according to one embodiment of the present invention.

Referring to FIG. 4, a portion of the transport mechanism 104 including diverters **130*a*-130*d* are illustrated. A substantial portion of the transport path of the currency handling device 100 positively grips the bills during transport from the pair of stripping wheels 140 through the point where bills are delivered to upper output receptacle 106*a* or are delivered to the stacker wheels 202 of output receptacles 106*b*-106*h*. The positive grip transport path of the currency handling device 100** is less costly and weighs less than the vacuum transport arrangements of other currency processing devices.

The transport mechanism 104 is electronically geared causing all sections to move synchronously from the evaluation region 108 through the point where the bills are delivered to the output receptacles 106. Multiple small motors are used to drive the transport mechanism 104. Using multiple small, less costly motors is more efficient and less costly than a single large motor Further, less space is consumed enabling the currency handling device 100 to be more compact. Electronically gearing the transport mechanism 104 enables a single encoder to monitor bill transportation within the currency handling system 100. The encoder is linked to the bill transport mechanism 104 and provides input to a processor to determine the timing of the operations of the currency handling device 100. In this manner, the processor is able to monitor the precise location of the bills as they are transported through the currency handling device 100. This process is termed “flow control” Input from additional sensors 119 located along the transport mechanism 104 of the currency handling device 100 enables the processor to continually update the position of a bill within the device 100 to accommodate for bill slippage. When a bill leaves the evaluation region 108 the processor expects the bill to arrive at the diverter **130*a* corresponding to the first lower output receptacle 106*c*** after a precise number of encoder counts. Specifically, the processor expects the bill to flow past each sensor

119 positioned along the transport mechanism 104 at a precise number of encoder counts. If the bill slips during transport but passes a sensor 119 later within an acceptable number of encoder counts the processor updates or "re-queues" the new bill position. The processor calculates a new figure for the time the bill is expected to pass the next sensor 119 and arrive at the first diverter 130*a* The processor activates a the one of the diverters 130*a-f* to direct the bill into the appropriate corresponding lower output receptacle 106*c*-106*h* when the sensor 119 immediately preceding the diverter 130 detects the passage of the bill to be directed into the appropriate lower output receptacle 106*c-h*.

The currency handling device 100 also uses flow control to detect jams within the transport mechanism 104 of the device 100. When a bill does not reach a sensor 119 within in the calculated number of encoder counts plus the maximum number of counts allowable for slippage, the processor suspends operation of the device 100 and informs the operator via the display/user-interface 122 that a jam has occurred. The processor also notifies the operator via the display/user-interface 122 of the location of the jam by indicating the last sensor 119 that the bill passed and generally the approximate location of the jam in the system. If the operator cannot easily remove the bill without damage, the operator can then electronically jog the transport path in the forward or reverse direction via the control unit 120 so that the jammed bill is dislodged and the operator can easily remove the bill from the transport path. The operator can then flush the system causing the transport mechanism 104 to deliver all of the bills currently within the transport path of the currency handling device 100 to one of the output receptacles 106. In an alternative embodiment, the user of the currency handling device 100 would have the option when flushing the system to first have the bills already within the escrow regions 116*a*-116*f* to be delivered to the respective lower storage cassettes 106*c*-106*h* so that those bills may be included in the aggregate value data for the bills being processed. The bills remaining in the transport path 104 would then be delivered to a predetermined escrow region 116 where those bills could be removed and reprocessed by placing those bills in the input receptacle 102.

Utilizing flow control to detect jams is more desirable than prior art currency evaluation machines which do not detect a jam until a sensor is actually physically blocked. The latter method of jam detection permits bills to pile up while waiting for a sensor to become blocked Bill pile-up is problematic because it may physically halt the machine before the jam is detected and may cause physical damage to the bills and the machine In order to remedy a jam in a prior art machine, the operator must first manually physically dislodge the jammed bills. The operator must then manually turn a hand crank which advances the transport path until all bills within the transport path are removed Moreover, because the prior art devices permit multiple bills to pile up before a jam is detected, the integrity of the process is often ruined. In such a case, the entire stack of bills must be reprocessed. A method for reconciling the occurrences of bills becoming jammed in connection with a multi-pocket currency handling device, such as discussed in connection with FIGS. 1*a* and 1*b* is described in commonly owned, copending U.S. patent application Ser. No. 09/688,526, entitled "Currency Handling System Having Multiple Output Receptacles" and filed on Oct. 16, 2000, which is incorporated herein by reference in its entirety.

Referring back to FIG. 1*a*, the illustrated embodiment of the currency handling device 100 includes a total of six lower output receptacles 106*c*-106*h*. More specifically, each of the lower output receptacles 106*c*-106*h* includes a first portion designated as an escrow compartment 116*a*-116*f* and a second portion designated as a storage cassette 118*a*-118*f* Typically, bills are initially directed to the escrow compartments 116, and thereafter at specified times or upon the occurrence of specified events, which may be selected or programmed by an operator, bills are then fed to the storage cassettes 118. The storage cassettes are removable and replaceable, such that stacks of bills totaling a predetermined number of bills or a predetermined monetary value may be accumulated in a given storage cassette 118, whereupon the cassette may be removed and replaced with an empty storage cassette. In the illustrated embodiment, the number of lower output receptacles 106*c*-106*h* including escrow compartments 116 and storage cassettes 118 are six in number. In alternative embodiments, the currency handling device 100 may contain more or less than six lower output receptacles including escrow compartments and storage cassettes 118. In other alternative embodiments, modular lower output receptacles 106 can be implemented to add many more lower output receptacles to the currency handling system 100. Each modular unit may comprise two lower output receptacles. In other alternative embodiments, several modular units may be added at one time to the currency handling device 100

A series of diverters 130*a*-130*f*, which are a part of the transportation mechanism 104, direct the bills to one of the lower output receptacles 106*c*-106*h*. When the diverters 130 are in an upper position, the bills are directed to the adjacent lower output receptacle 106. When the diverters 130 are in a lower position, the bills proceed in the direction of the next diverter 130

Figure 5:
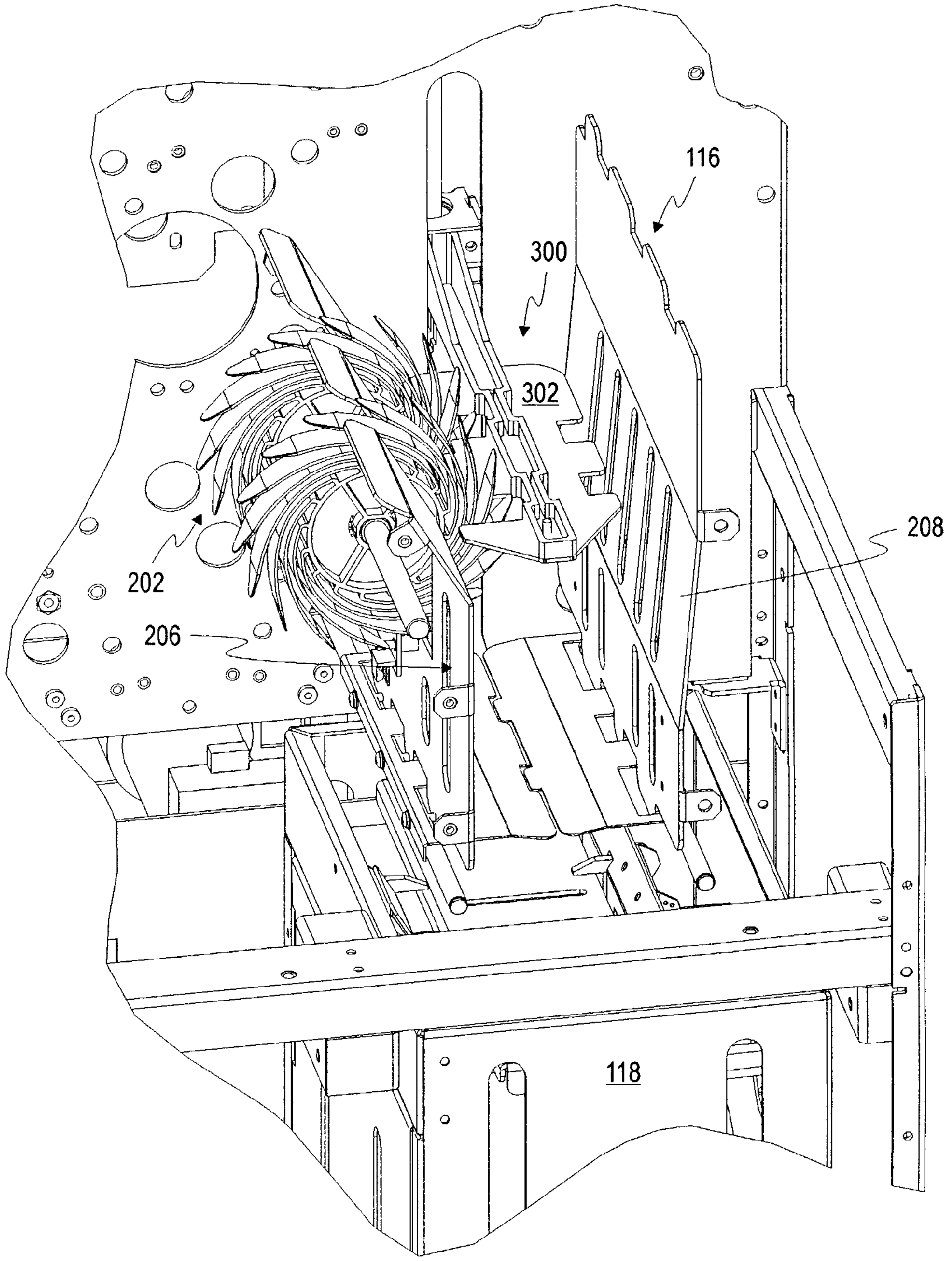
FIG. 5 is a front perspective view of an escrow compartment, a plunger assembly, and a storage cassette according to one embodiment of the document handling device of the present invention.

The vertical arrangement of the lower output receptacles 106*c*-106*h* is illustrated in FIG. 5. The escrow compartment 116 is positioned above the storage cassette 118. In addition to the escrow compartment 116 and the storage cassette 118, each of the lower output receptacles 106*c*-106*h* contains a plunger assembly 300. The plunger assembly 300 is shown during its decent towards the storage cassette 118

Figure 6:
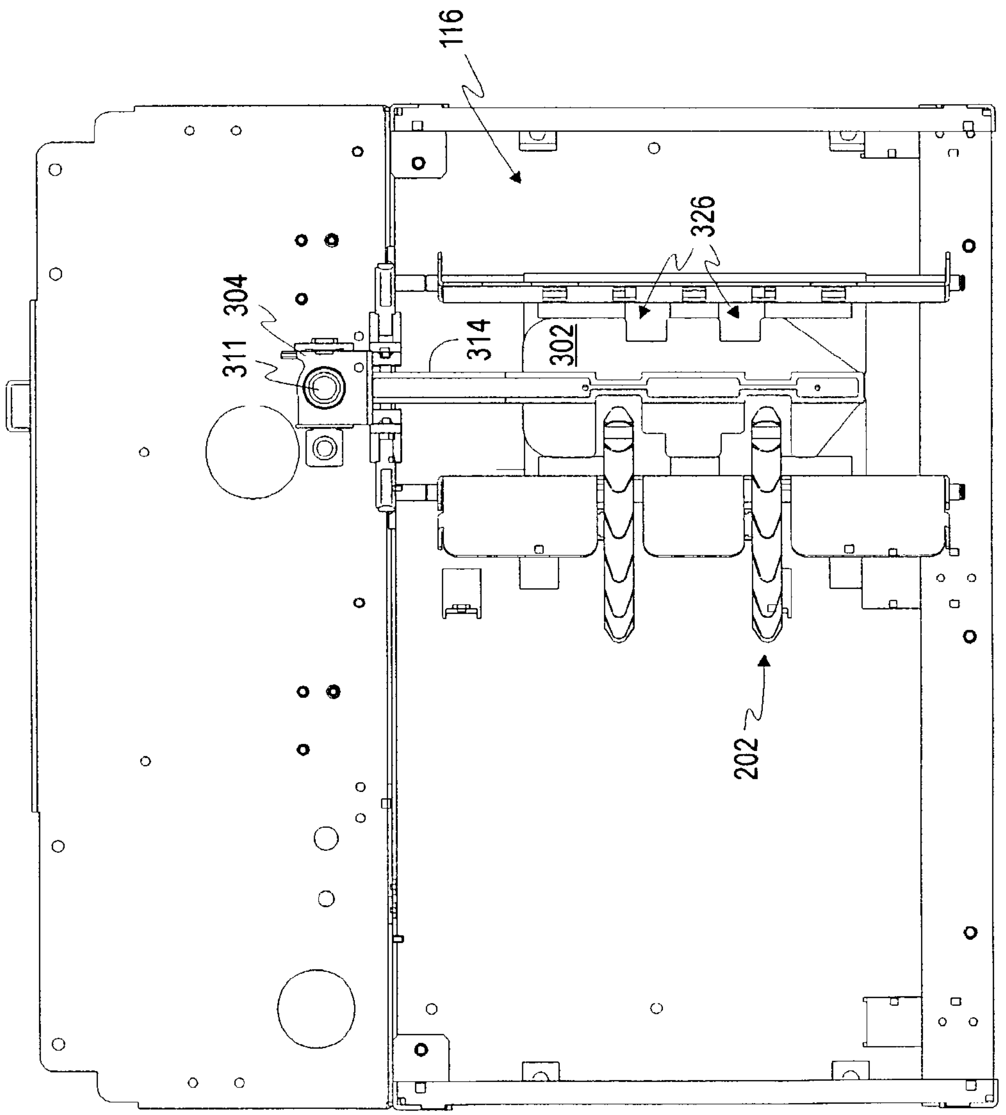
FIG. 6 is a top view of an escrow compartment and plunger assembly according to one embodiment of the document handling device of the present invention.
Figure 7:
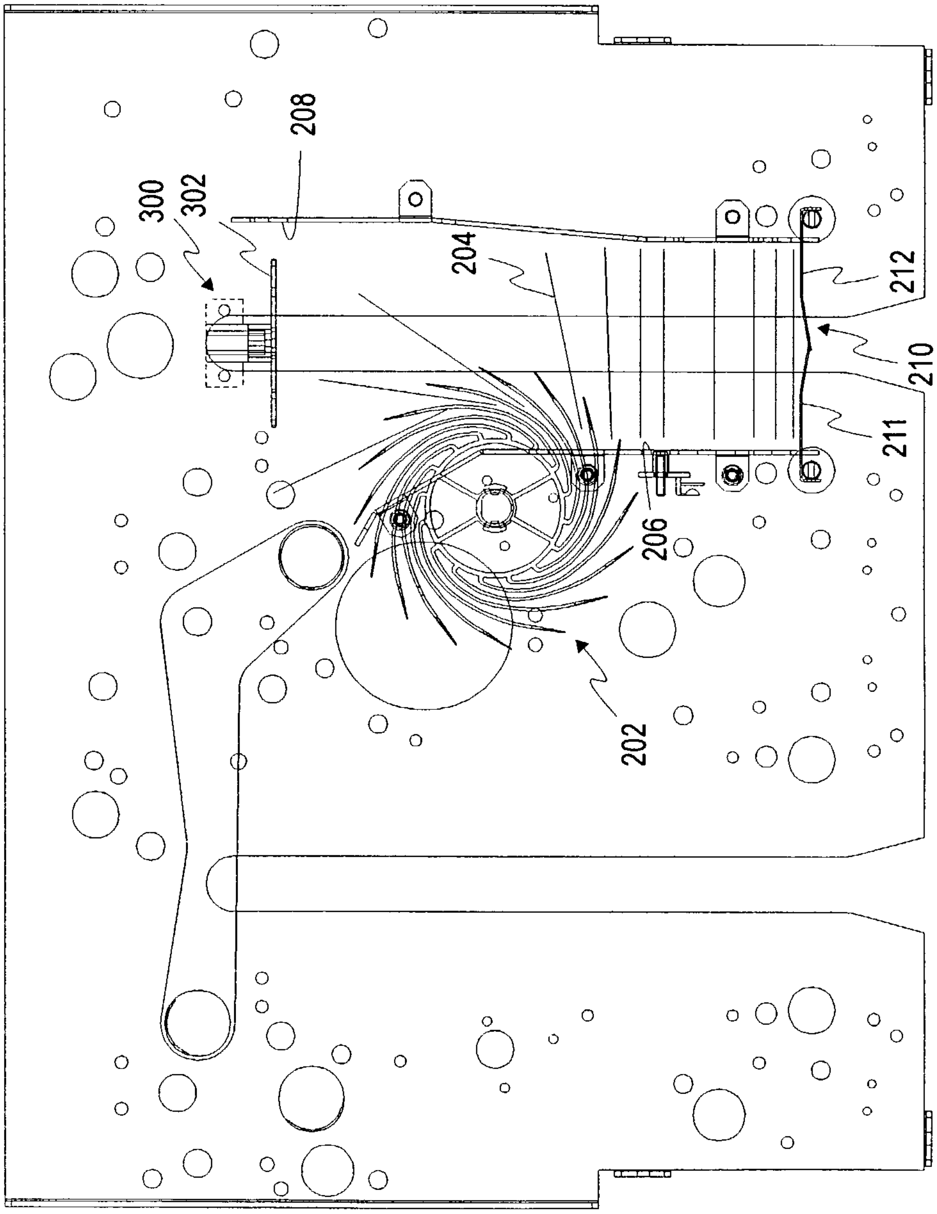
FIG. 7 is a front view of an escrow compartment and plunger assembly according to one embodiment of the document handling device of the present invention.

Referring now to FIGS. 6 and 7, one of the escrow compartments 116 of the lower output receptacles 106*c*-106*h* is shown. The escrow compartment 116 contains a stacker wheel 202 to receive the bills 204 from the diverter 130. The stacker wheel 202 stacks the bills 204 within the escrow compartment walls 206, 208 on top of a gate 210 disposed between the escrow compartment 116 and the storage cassette 118. In an alternative embodiment, the escrow compartment 116 contains a pair of guides to aid in aligning the bills substantially directly on top of one another. The gate 210 is made up of two shutters: a first shutter 211 and a second shutter 212. The shutters 211, 212 are hingedly connected enabling the shutters 211, 212 to rotate downward approximately ninety degrees to move the gate from a first position (closed position) wherein the shutters 211, 212 are substantially co-planer to a second position (open position) wherein the shutters 211, 212 are substantially parallel Below the gate 210 is the storage cassette 118 (not shown in FIGS. 6 and 7).

Figure 8:
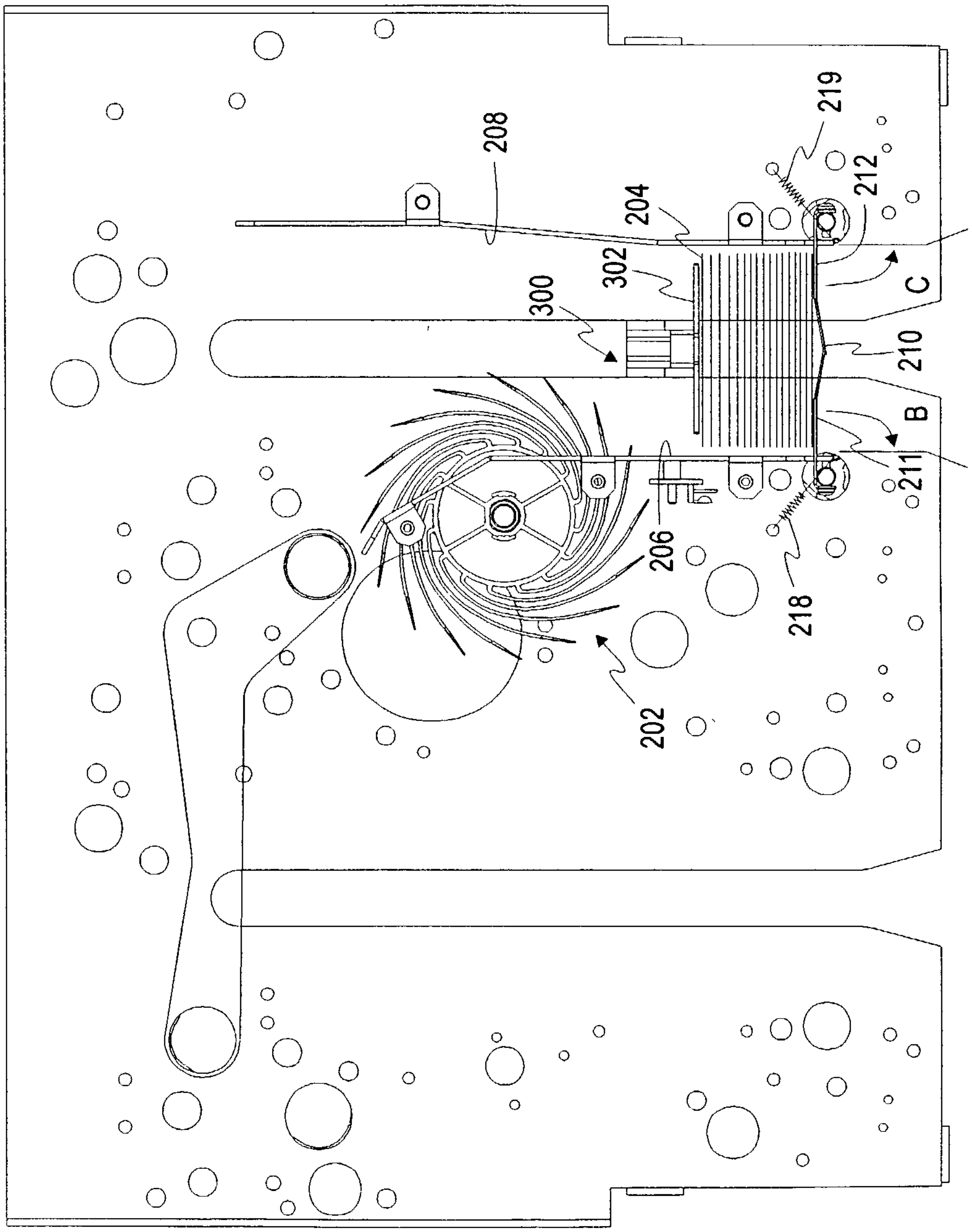
FIG. 8 is another front view of an escrow compartment and plunger assembly according to one embodiment of the document handling device of the present invention.

FIG. 8 illustrates the positioning of the paddle 302 when transferring a stack of bills from the escrow compartment 116 to the storage cassette 118. When the paddle descends upon the stack of bills 204 it causes shutters 211, 212 to quickly rotate in the directions referred to by arrows B and C, respectively, thus, "snapping" open the gate 210. The quick rotation of the shutters 211, 212 insures that the bills fall into the storage cassette 118 in a substantially stacked manner. According to one embodiment, the paddle descends after a predetermined number of bills 204 are stacked upon the gate 210. According to other embodiments, the operator can instruct the paddle 302 via the control unit 120 to descend upon the bills 204 stacked upon the gate 210.

Figure 9:
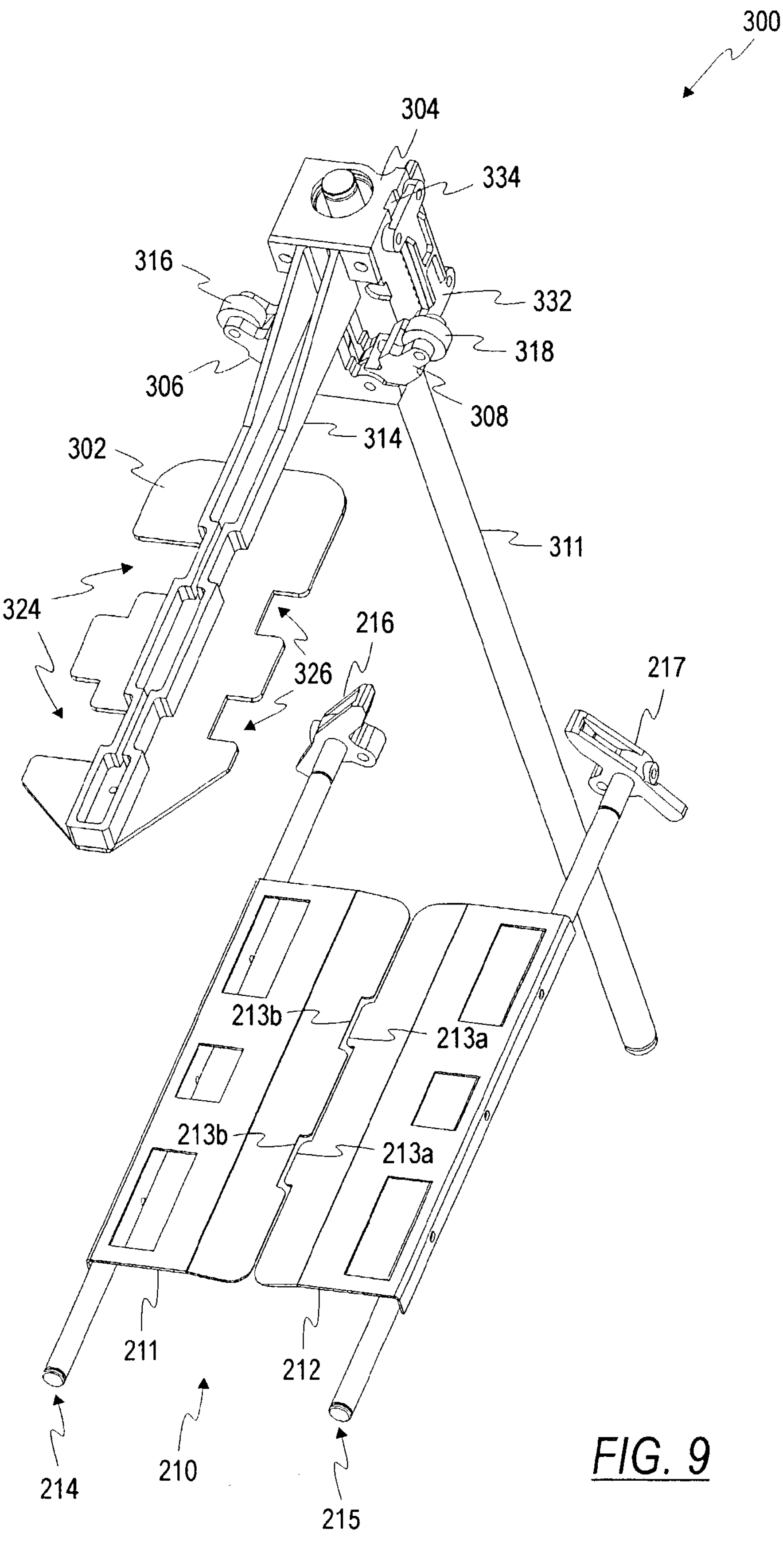
FIG. 9 is a perspective view of an apparatus for transferring currency from an escrow compartment to a storage cassette according to one embodiment of the document handling device of the present invention.

Referring now to FIG. 9, the plunger assembly 300 for selectively transferring the bills 204 from an escrow compartment 116 to a corresponding storage cassette 118 and the gate 210 are illustrated in more detail. One such plunger assembly 300 is provided for each of the six lower output receptacles 106*c*-106*h* of the currency handling device 100. The plunger assembly 300 comprises a paddle 302, a base 304, and two side arms 306, 308. Each of the shutters 211, 212 comprising the gate 210 extends inwardly from corresponding parallel bars 214, 215. The bars 214, 215 are mounted for pivoting the shutters between the closed position and the open position. Levers 216, 217 are coupled to the parallel bars 214, 215, respectively, to control the rotation of the bars 214, 215 and hence of the shutters 211, 212. Extension springs 218, 219 (shown in FIG. 8) tend to maintain the position of the levers 216, 217 both in the closed and open positions The shutters 211, 212 have an integral tongue 213*a* and groove 213*b* arrangement which prevents any bills which are stacked upon the gate 210 from slipping between the shutters 211, 212.

The base 304 travels along a vertical shaft 311 with which it is slidably engaged. The base 304 may include linear bearings (not shown) to facilitate its movement along the vertical shaft 311. The plunger assembly 300 may also include a vertical guiding member 312 (see FIG. 11) with which the base 304 is also slidably engaged. The vertical guiding member 312 maintains the alignment of the plunger assembly 300 by preventing the plunger assembly 300 from twisting laterally about the vertical shaft 311 when the paddle 302 forces the bills 204 stacked in the escrow area 116 down into a storage cassette 118.

Figure 10:
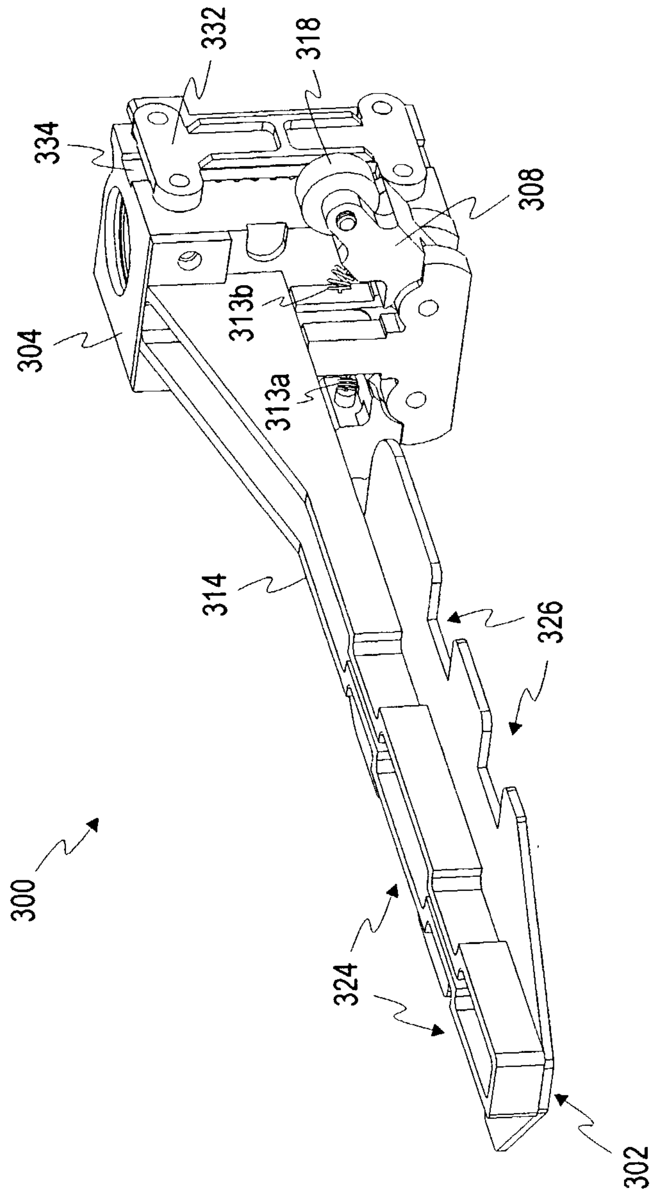
FIG. 10 is a perspective view of a paddle according to one embodiment of the document handling device of the present invention.

Referring also to FIG. 10, the paddle 302 extends laterally from the base 304. The paddle 302 is secured to a support 314 extending from the base 304. A pair of side arms 306, 308 are hingedly connected to the base Each of the side arms 306, 308 protrude from the sides of the base 304. Rollers 316, 318 are attached to the side arms 306, 308, respectively, and are free rolling. Springs 313*a*, 313*b* are attached to the side arms 306, 308, respectively, to bias the side arms 306, 308 outward from the base 304. In the illustrated embodiment, the spring 313*a*, 313*b* are compression springs.

The paddle 302 contains a first pair of slots 324 to allow the paddle to clear the stacker wheel 202 when descending into and ascending out of the cassette 118. The first pair of slots 324 also enables the paddle 302 to clear the first pair of retaining tabs 350 within the storage cassette (see FIG. 14). Similarly, paddle 302 contains a second pair of slots 326 to enable the paddle 302 to clear the second pair of retaining tabs 350 within the storage cassette 118 (see FIG. 14).

Figure 11:
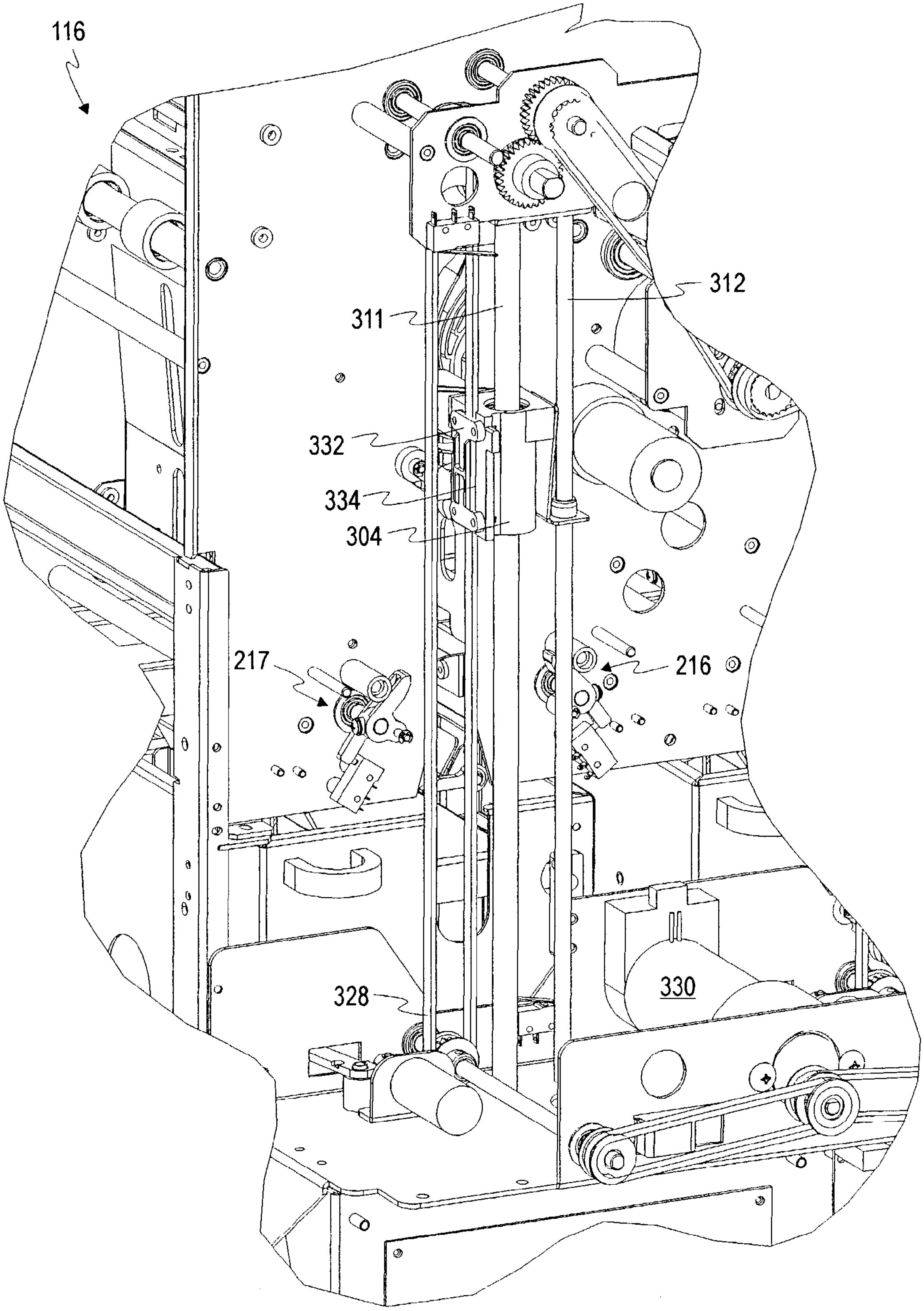
FIG. 11 is a rear perspective view of the escrow compartment, plunger assembly, and storage cassette according to one embodiment of the document handling device of the present invention.

Referring now to FIG. 11, which illustrates a rear view of one of the lower output receptacles 106*c*-106*h*, the plunger 300 is bidirectionally driven by way of a belt 328 coupled to an electric motor 330. A clamp 332 engages the belt 328 into a channel 334 in the base 304 of the plunger assembly 300. In the embodiment illustrated in FIG. 11, two plunger assemblies 300 are driven by a single electric motor 330. In one embodiment of the currency handling device, the belt 328 is a timing belt. In other alternative embodiments, each plunger assembly 300 can be driven by a single electric motor 330. In still other alternative embodiments, there can be any combination of motors 330 to plunger assemblies 300

Figure 12:
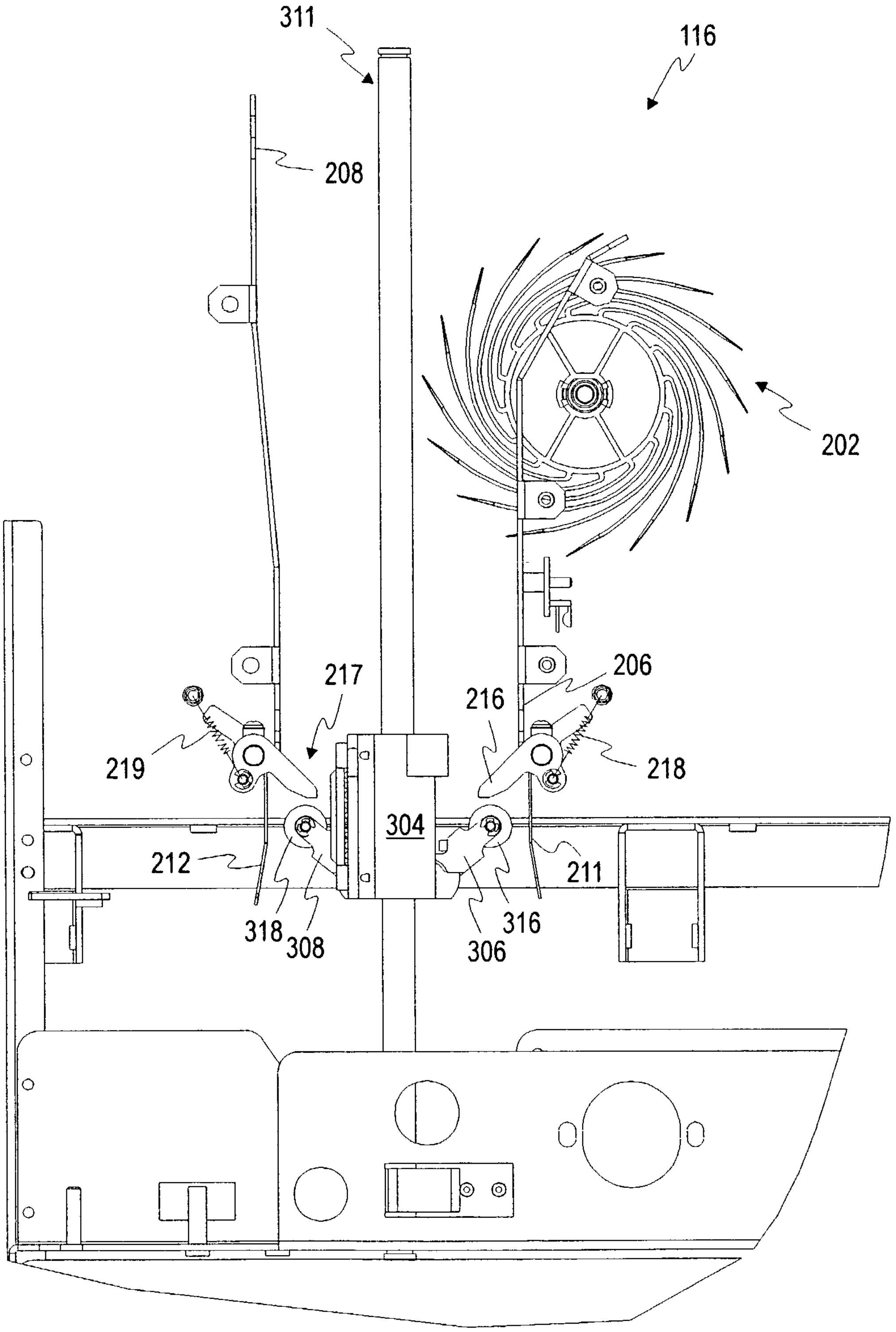
FIG. 12 is a rear view of a plunger assembly wherein the gate is in the open position according to one embodiment of the document handling device of the present invention.
Figure 13:
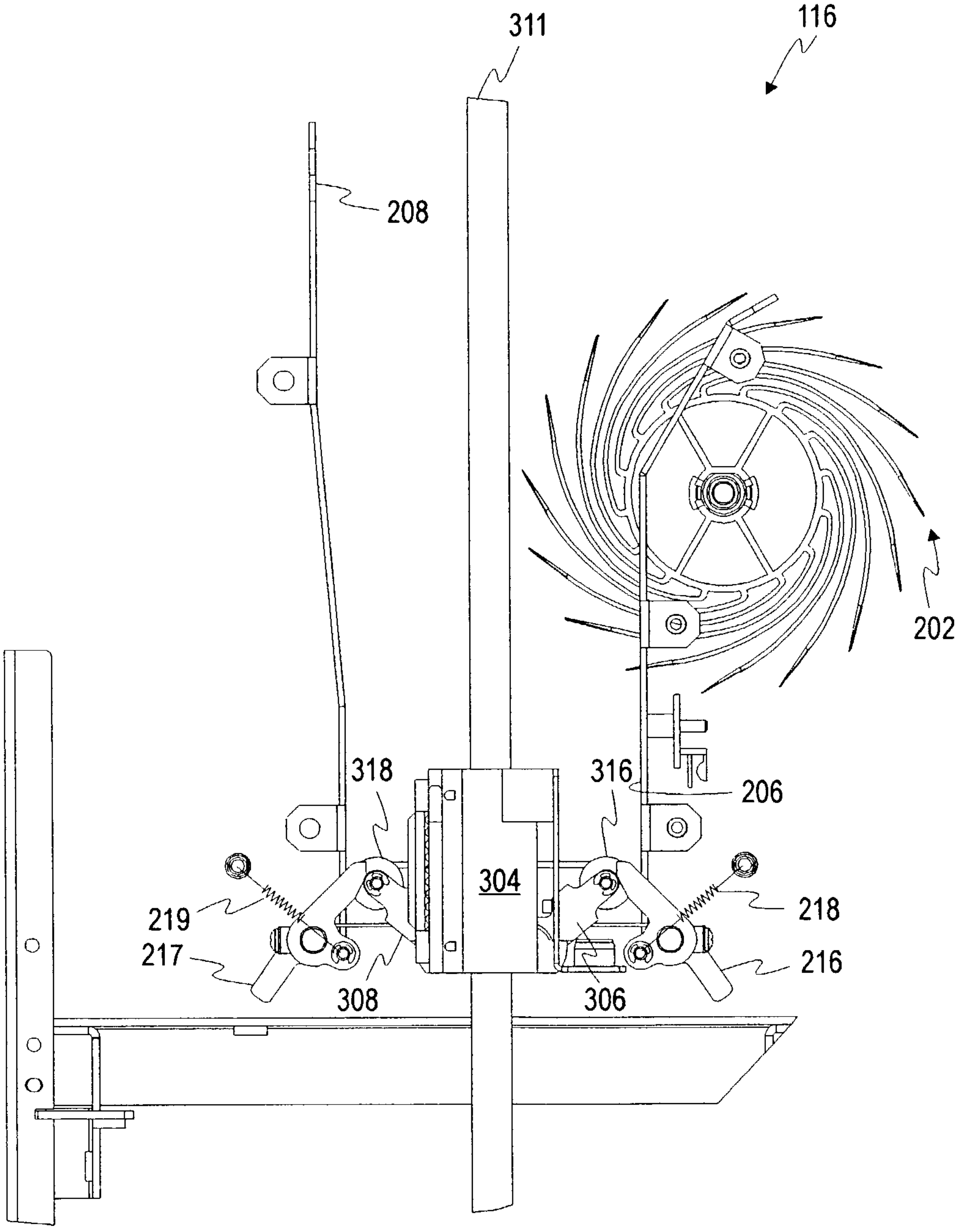
FIG. 13 is a rear view of a plunger assembly wherein the gate is in the closed position according to one embodiment of the document handling device of the present invention.

FIGS. 12 and 13 illustrate the interaction between the side arms 306, 308 and the levers 216, 217 when the paddle assembly 300 is descending towards and ascending away from the storage cassette 118, respectively. Initially, before descending towards the cassette, the shutters are in a first (closed) position. In the illustrated embodiment, it is the force imparted by the paddle 302 which opens the gate 210 when the paddle descends towards the storage cassette 118. When the paddle is ascending away from the storage cassette 119, it is the rollers 316, 318 coupled to the side arms 306, 308 which engage the levers 216, 217 that close the gate 210. The levers 216, 217 shown in FIG. 12 are positioned in the open position. When descending towards the storage cassette 118, the rollers 316, 318 contact the levers 216, 217 and roll around the levers 216, 217 leaving the shutters in the open position. The side arms 306, 308 are hinged in a manner which allows the side arms 306, 308 to rotate inward towards the base 304 as the rollers 316, 318 engage the levers 216, 217 FIG. 13 illustrates the levers in the second position wherein the gate 210 is closed. When the paddle ascends out of the storage cassette, the side arms 306, 308 are biased away from the base 304. The rollers 316, 318 engage the levers 216, 217 causing the levers to rotate upward to the first position thus closing the gate.

Figure 14:
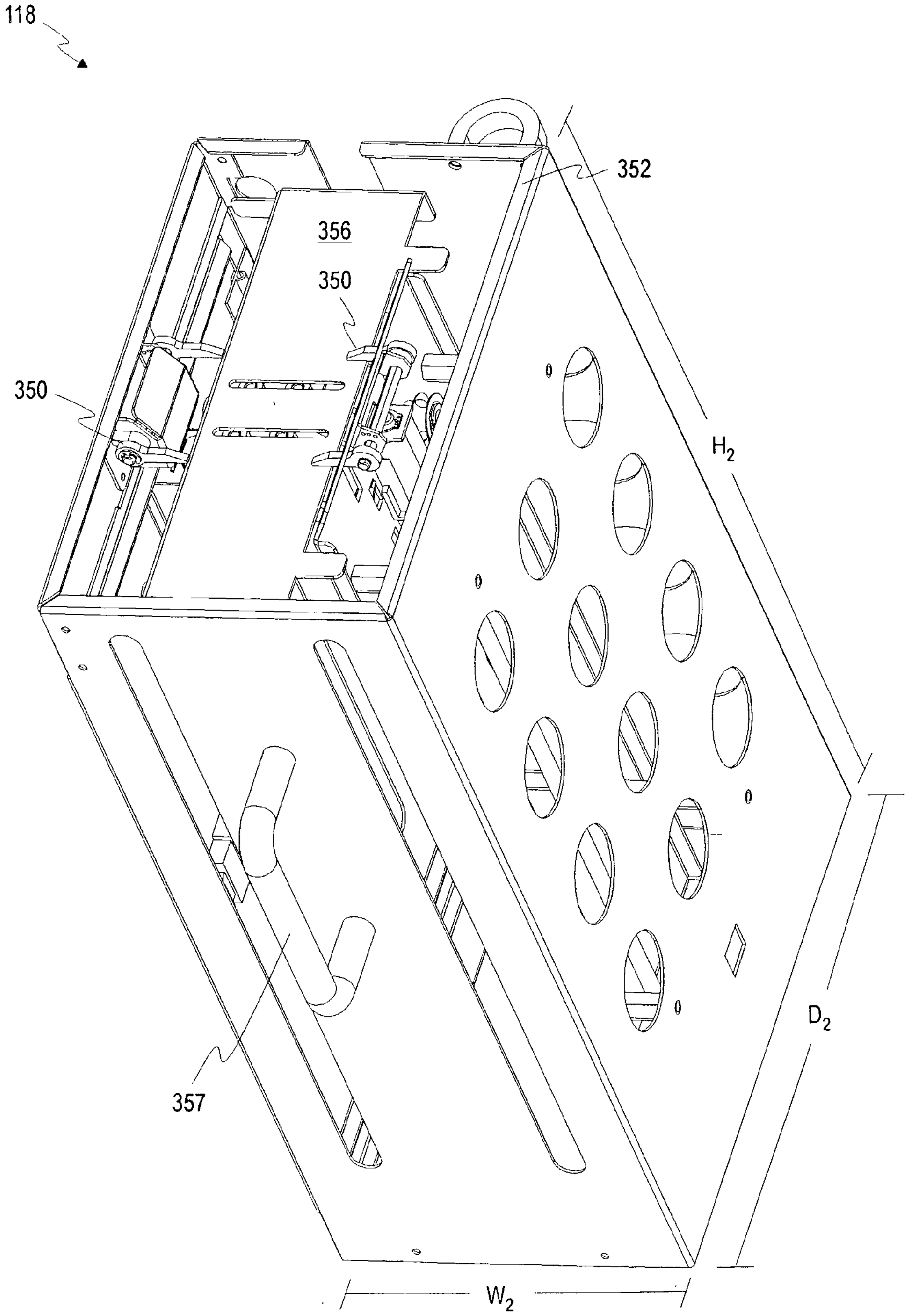
FIG. 14 is a perspective view of a storage cassette according to one embodiment of the document handling device of the present invention.
Figure 15:
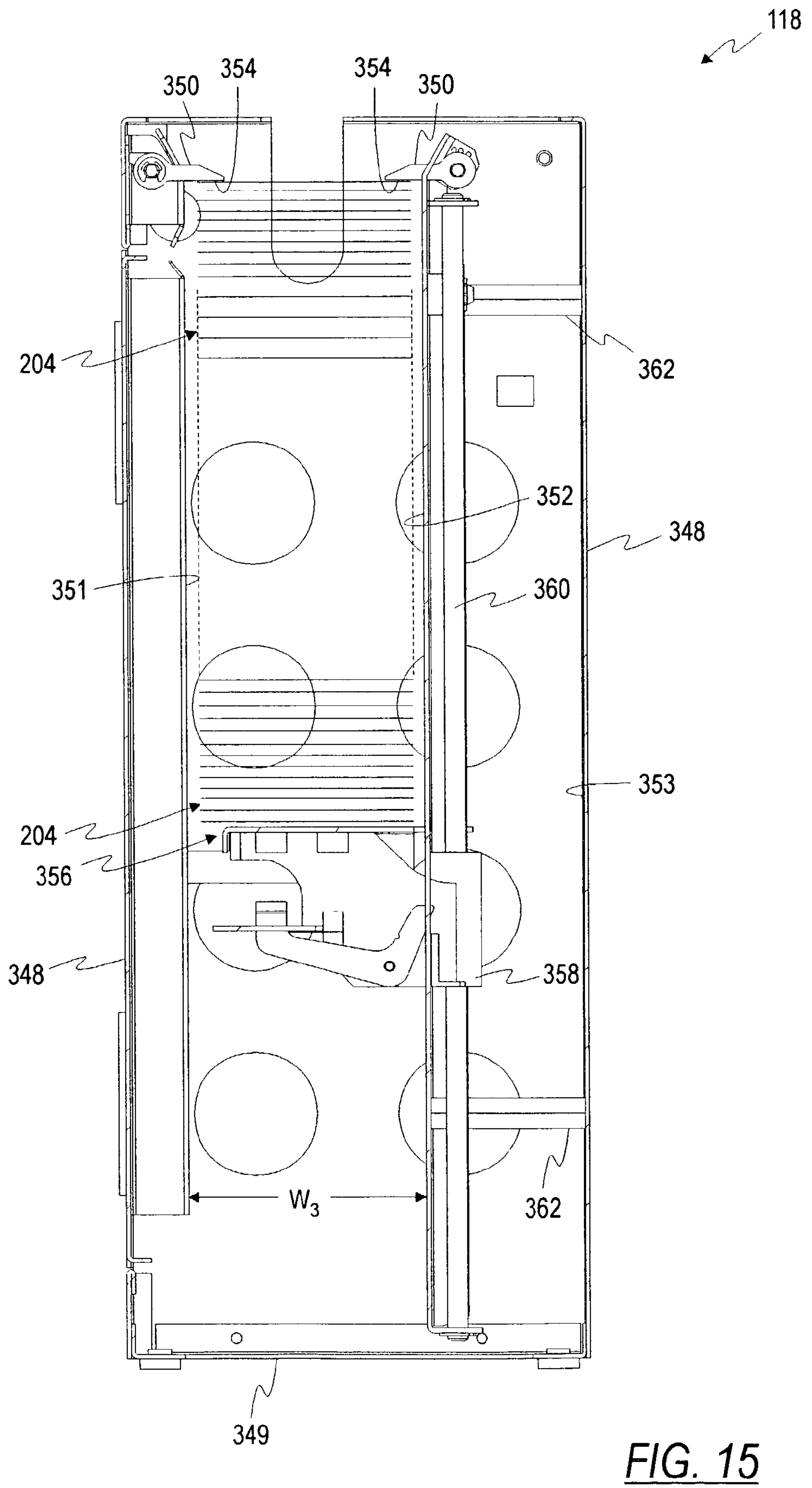
FIG. 15 is a rear view of a storage cassette according to one embodiment of the document handling device of the present invention.
Figure 16:
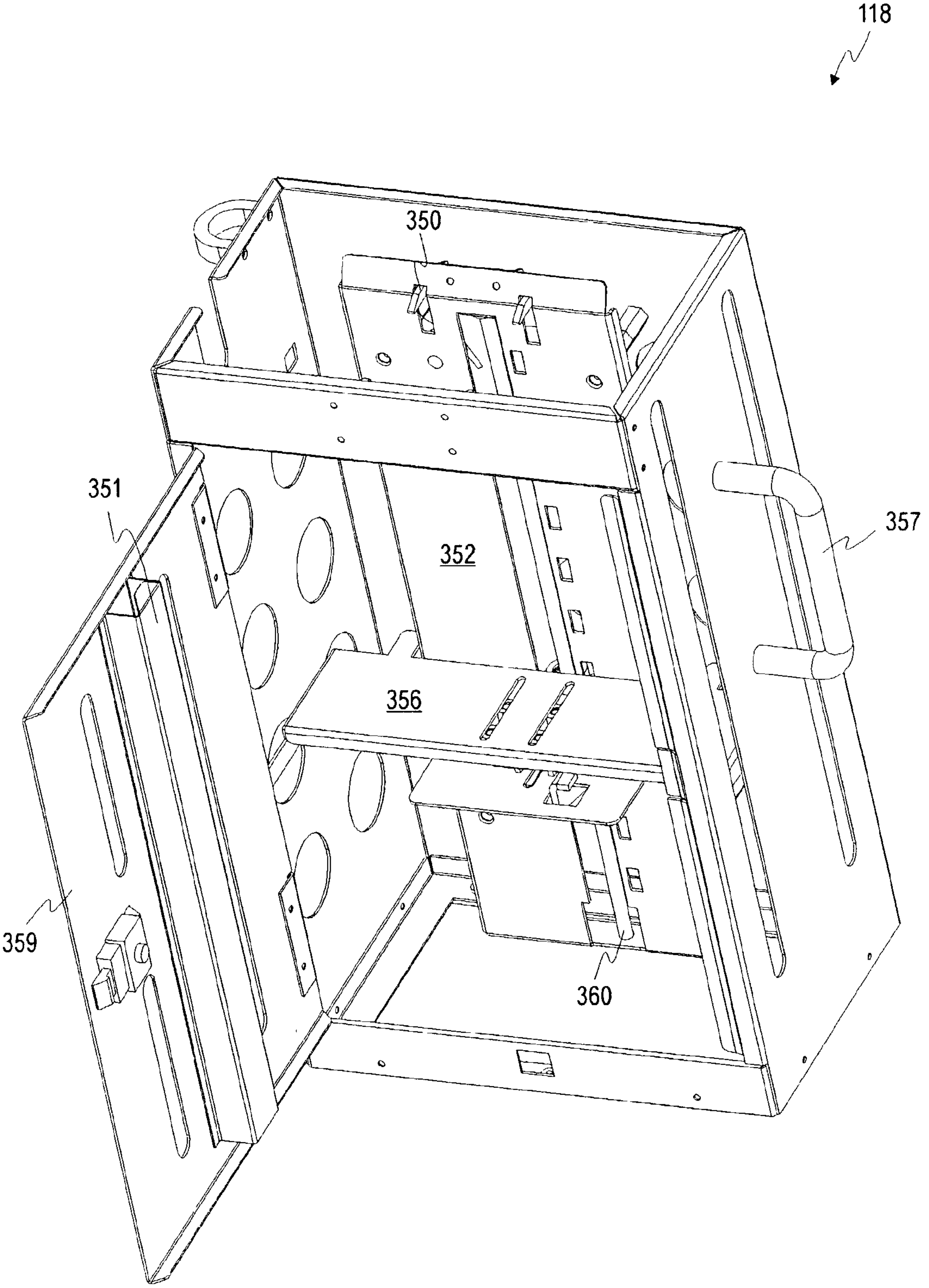
FIG. 16 is a perspective view of a storage cassette showing a door in the open position according to one embodiment of the document handling device of the present invention.

FIGS. 14, 15, and 16 illustrate the components of the storage cassettes 118. The bills 204 are stored within the cassette housing 348 which has a base 349. Each storage cassette 118 contains two pairs of retaining tabs 350 positioned adjacent to the interior walls 351, 352 of the storage cassette. The lower surface 354 of each tab 350 is substantially planar. The tabs 350 are hingedly connected to the storage cassette 118 enabling the tabs 350 to downwardly rotate from a horizontal position, substantially perpendicular with the side interior walls 351, 352 of the cassette 118, to a vertical position, substantially parallel to the interior walls 351, 352 of the cassette 118. The tabs 350 are coupled to springs (not shown) to maintain the tabs in the horizontal position.

The storage cassette 118 contains a slidable platform 356 which is biased upward. During operation of the currency handling system 100, the platform 356 receives stacks of bills from the escrow compartment 116. The floor 356 is attached to a base 358 which is slidably mounted to a vertical support member 360. The base 358 is spring-loaded so that it is biased upward and in turn biases the platform 356 upward The storage cassettes 118 are designed to be interchangeable so that once full, a storage cassette can be easily removed from the currency handling device 100 and replaced with an empty storage cassette 118. In the illustrated embodiment, the storage cassette 118 is equipped with a handle 357 in order to expedite removal and/or replacement of the storage cassettes 118. Also in the illustrated embodiment, the storage cassette 118 has a door 359 which enables an operator to remove bills from the storage cassette 118

Figure 17A:
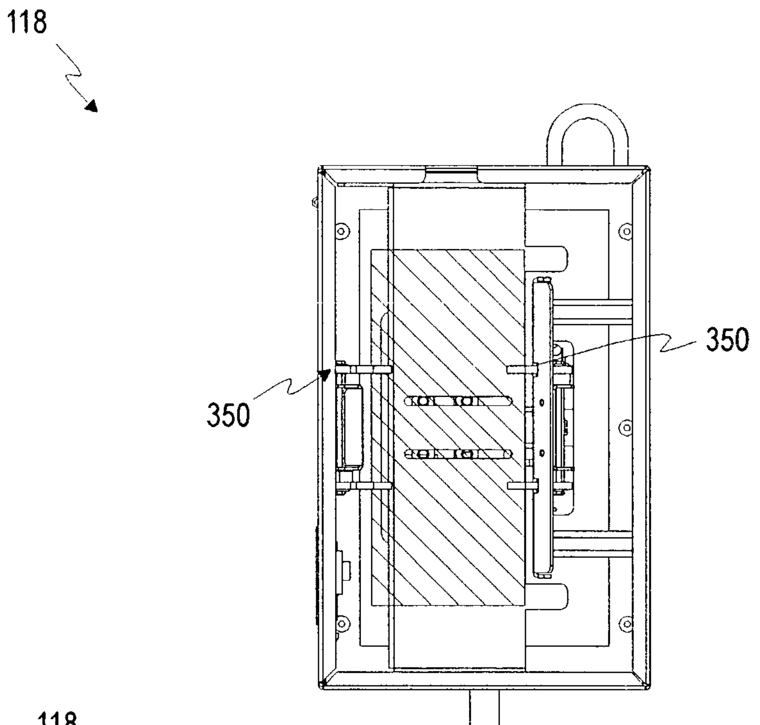
FIG. 17*a* is a top view of a storage cassette sized to accommodate United States currency documents according to one embodiment of the document handling device of the present invention.
Figure 17B:
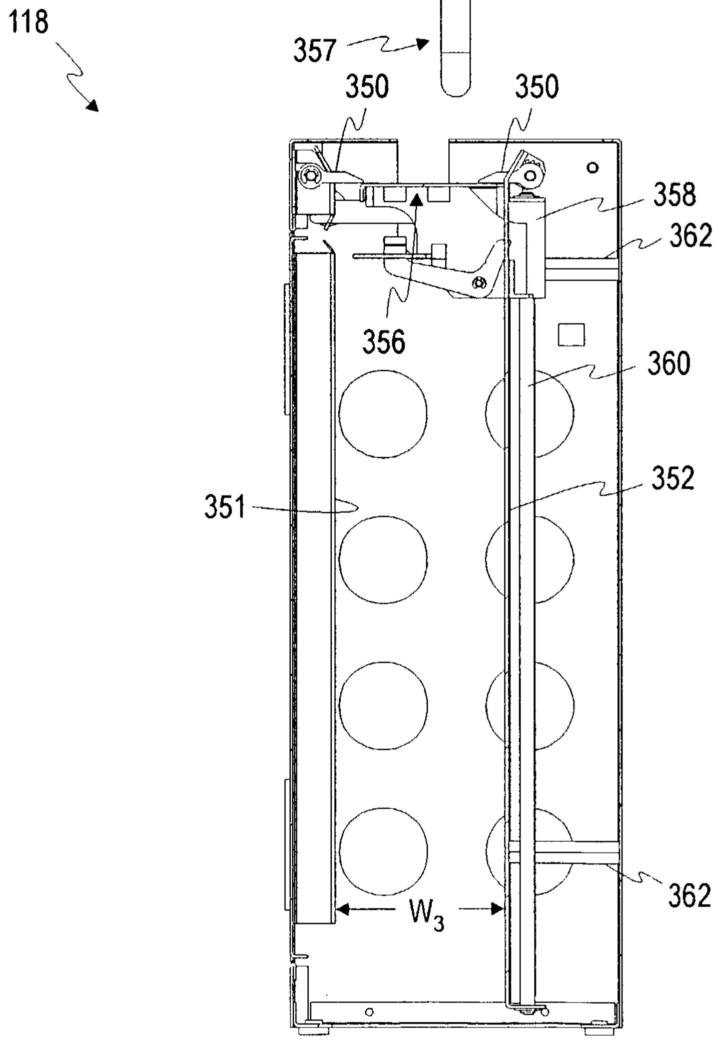
FIG. 17*b* is a rear view of a storage cassette sized to accommodate United States currency documents according to one embodiment of the document handling device of the present invention.
Figure 18A:
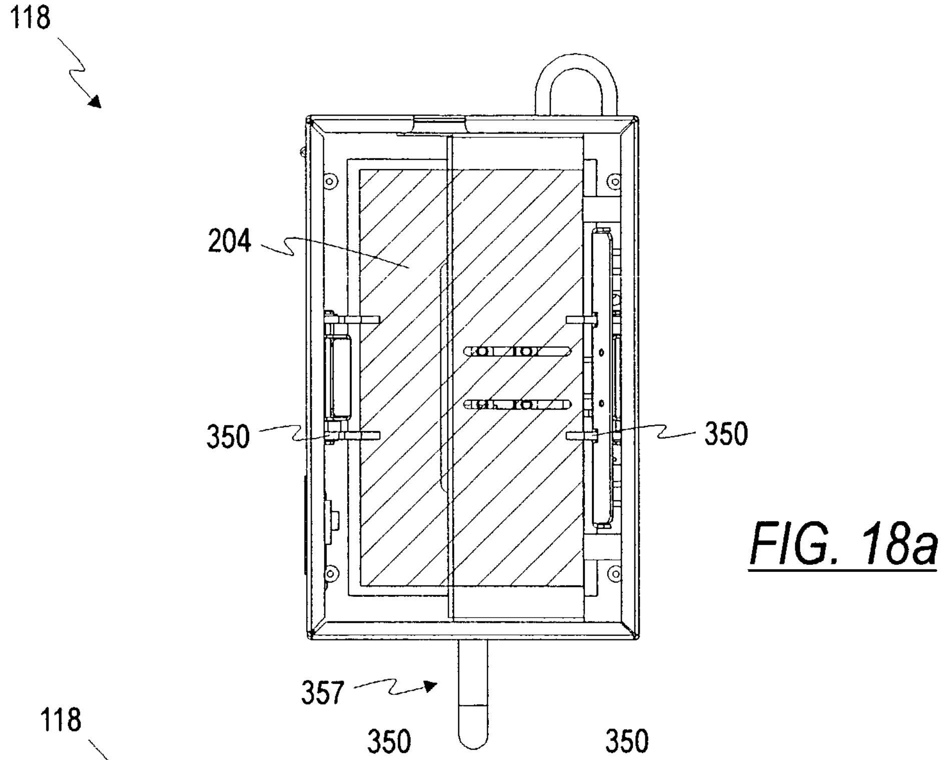
FIG. 18*a* is a top view of a storage cassette sized to accommodate large documents according to one embodiment of the document handling device of the present invention.
Figure 18B:
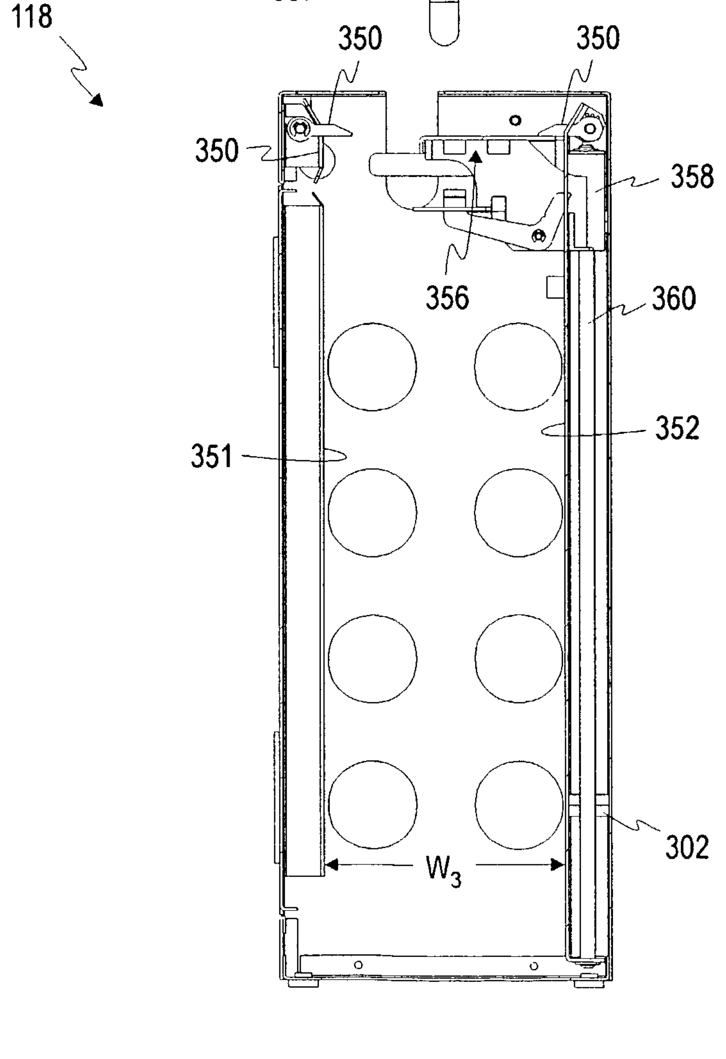
FIG. 18*b* is a rear view of a storage cassette sized to accommodate large documents according to one embodiment of the document handling device of the present invention.

The storage cassettes 118 are dimensioned to accommodate documents of varying sizes. In the illustrated embodiment, the storage cassettes 118 has a height, $H_2$, of approximately 15.38 inches (39 cm), a depth, $D_2$, of approximately 9 inches (22.9 cm), and a width, $W_2$, of approximately 5.66 inches (14.4 cm). The storage cassette illustrated in FIG. 15 has stand-offs 362 to set interior wall 352 off a fixed distance from in the interior wall 353 of the cassette housing 348. The interior walls 351, 352 aid in aligning the bills in a stack within the storage cassettes The embodiment of the storage cassette illustrate in FIG. 15 is sized to accommodate United States currency documents. To properly accommodate United States currency documents, the interior width of the storage cassette, $W_3$, is approximately 2.88 inches. FIGS. 17*a* and 17*b* also illustrate an embodiment of the storage cassette 118 sized to accommodate U.S. currency documents which have a width of approximately 2.5 inches (approximately 6.5 cm) and a length of approximately 6 inches (approximately 15.5 cm). In alternative embodiments, the length of the stand-offs 362 can be varied to accommodate documents of varying sizes. For example, the embodiment disclosed in FIG. 18*a* and 18*b* has an interior width, $W_3$ of approximately 4.12 inches (104.6 cm) and is sized to accommodate the largest international currency, the French 500 Franc note, which has width of approximately 3.82 inches (9.7 cm) and a length of approximately 7.17 inches (18.2 cm). In order to accommodate large documents and increase the interior width, $W_3$, of the storage cassette 118, the lengths of stand-offs 362, illustrated in FIG. 16*b*, are shortened.

Beginning with FIG. 7, the operation of one of the lower output receptacles 106*c*-106*h* will be described. Pursuant to a mode of operation, the bills 204 are directed by one of the diverters 130 into the escrow compartment 116 of the lower output receptacle The stacker wheel 202 within escrow compartment 116 receives the bills 204 from the diverter 130. The stacker wheel 202 stacks the bills 204 on top of the gate 210. Pursuant to a preprogrammed mode of operation, once a predetermined number of bills 204 are stacked in the escrow compartment 116, the control unit 120 instructs the currency handling device 100 to suspend processing currency bills and the paddle 302 then descends from its home position above the escrow compartment 116 to transfer the bills 204 into the storage cassette 118. Once the bills 204 have been deposited in the storage cassette 118 the currency handling device resumes operation until an escrow compartment is full or all the bills within the input receptacle 102 have been processed.

Referring now to FIGS. 8 and 9 the plunger assembly 300 downwardly travels placing the paddle 302 onto of the stack of bills 204. Upon making contact with the bills 204 the paddle 302 continues to travel downward. As the paddle 302 continues its descent, the paddle 302 forces the gate 210 to snap open. The paddle 302 imparts a force to the bills 204 that is transferred to the to the shutters 211, 212 causing the shutters 211, 212 to rotate from the closed position to the open position The rotation of the shutters 211, 212 is indicated by the arrows B and C, respectively. Once the paddle 302 imparts the amount of force necessary to rotate levers 216, 217, the extension springs 218, 219 quickly rotate the shutters 211, 212 downward, thus "snapping" the gate 210 open The downward rotation of the shutters 211, 212 causes each of the corresponding parallel bars 214, 215 to pivot which in turn rotates the levers 216, 217. The extension springs 218, 219 maintain the shutters 211, 212 in the open position allowing the paddle 302 to descend into the storage cassette 118. The hingedly connected side arms 306, 308 retract as the rollers 316, 318 to roll around the levers 216, 217 while the plunger assembly 300 is traveling downward into the cassette 118.

Referring now to FIG. 15, once the gate 210 is opened, the bills 204 fall a short distance onto the platform 356 of the storage cassette 118 or onto a stack of bills 204 already deposited on the platform 356. The paddle 302 continues its downward motion towards the storage cassette 118 to ensure that the bills 204 are transferred to the cassette 118. Initially, some bills 204 may be spaced apart from the platform 356 or the other bills 204 within the storage cassette by retaining tabs 350. As the plunger assembly 300 continues to descend downward into the cassette, the paddle 302 continues to urge the stack of bills 204 downward causing the retaining tabs 350 to rotate downward The bills 204 are pushed past retaining tabs 350 and onto the platform 356

Once the plunger assembly 300 has descended into the cassette 118 a distance sufficient for the paddle 302 to clear the retaining tabs 350 allowing the retaining tabs 350 to rotate upward, the plunger assembly initiates its ascent out of the storage cassette 118. The platform 356 urges the bills 204 upward against the underside of the paddle 302. The paddle 302 is equipped with two pairs of slots 324, 326 (FIG. 9) to enable the paddle to clear the pairs of retaining tabs 350. When the paddle 302 ascends past the pairs of retaining tabs 350 the bills 204 are pressed against the lower surfaces 354 of the pairs of retaining tabs 350 by the platform 356

Referring now to FIG. 13, when the plunger assembly 300 is traveling upward out of the cassette 118, the rollers 316, 318 on the side arms 306, 308 engage the respective levers 216, 217 and move the respective levers 216, 217 from the second (open) position to the first (closed) position to move the gate 210 from the open position to the closed position as the paddle 302 ascends into the escrow compartment 116 after depositing the bills 204 in the storage cassette 118. The paddle 302 is mounted on the base 304 above the rollers 316, 318 on the side arms 306, 308 so that the paddle 302 clears the gate 210 before the gate 210 is moved to the closed position.

In alternative embodiments of the currency handling device 100, the output receptacles 106 can be sized to accommodate documents of varying sizes such as various international currencies, stock certificates, postage stamps, store coupons, etc Specifically, to accommodate documents of different widths, the width of the escrow compartment 116, the gate 210, and the storage cassette 118 would need to be increased or decreased as appropriate. The document evaluation device 100 is sized to accommodate storage cassettes 118 and gates 210 of different widths. The entire transport mechanism 104 of the currency handling device 100 is dimensioned to accommodate the largest currency bills internationally. Accordingly, the document handling device 100 can be used to process the currency or documents of varying sizes.

In various alternative embodiments, the currency handling device 100 is dimensioned to process a stack of different sized currencies at the same time. For example, one application may require the processing of United States dollars (2.5 inches×6 inches, 6.5 cm×15.5 cm) and French currency (as large as 7.17 inches×3.82 inches, 18.2 cm×9.7 cm). The application may simply require the segregation of the U.S. currency from the French currency wherein the currency handling device 100 delivers U.S. currency to the first lower output receptacle 106*c* and the French currency to the second output receptacle 106*d*. In another alternative embodiment, the currency handling device 100 processes a mixed stack of U.S. ten and twenty dollar bills and French one hundred and two hundred Franc notes wherein the currency documents are denominated, counted, and authenticated. In that alternative embodiment, the U.S. ten and twenty dollar bills are delivered to the first 106*c* and second 106*d* lower output receptacles, respectively, and the French one hundred and two hundred Franc notes are delivered to the third 106*e* and fourth 106*f* lower output receptacle, respectively In other alternative embodiments, the currency handling device 100 denominates, counts, and authenticates six different types of currency wherein, for example, Canadian currency is delivered to the first lower output receptacle 106*c*, United States currency is delivered to the second output receptacle 106*d*, Japanese currency is delivered to the third lower output receptacle 106*e*, British currency is delivered to the fourth lower output receptacle 106*f*, French currency is delivered to the fifth lower output receptacle 106*g*, and German currency is delivered to the sixth lower output receptacle 106*h* In another embodiment, no call bills or other denominations of currency, such as Mexican currency for example, may be directed to the second upper output receptacle 106*b*. In another embodiment, suspect bills are delivered to the first upper output receptacle 106*a*.

In other alternative embodiments of the currency handling device 100, the user can vary the type of documents delivered to the output receptacles 106. For example, in one alternative embodiment an operator can direct, via the control unit 120, that a stack of one, five, ten, twenty, fifty, and one-hundred United States dollar bills be denominated, counted, authenticated, and directed into lower output receptacles 106*c*-106*h*, respectively In still another alternative embodiment, the currency handling device 100 is also instructed to deliver other bills, such as a United States two dollar bill or currency documents from other countries that have been mixed into the stack of bills, to the second upper output receptacle 106*b*. In still another alternative embodiment, the currency handling device 100 is also instructed to count the number and aggregate value of all the currency bills processed and the number and aggravate value of each individual denomination of currency bills processed These values can be communicated to the user via the display/user-interface 122 of the currency handling device 100. In still another alternative embodiment, no call bills and bills that are stacked upon one another are directed to the second upper output receptacle 106*b*. In still another alternative embodiment, the operator can direct that all documents failing an authentication test be delivered to the first upper output receptacle 106*a*. In another alternative embodiment, the operator instructs the currency handling device 100 to deliver no call bills, suspect bills, stacked bills, etc. to one of the lower output receptacles 106*c*-106*h*. The currency handling device 100 which has eight output receptacles 106*a*-106*h* provides a great deal of flexibility to the user. And in other alternative embodiments of the currency handling device 100, numerous different combinations for processing documents are available.

According to one embodiment, the various operations of the currency handling device 100 are controlled by processors disposed on a number of printed circuit boards ("PCBs") such as ten PCBs located throughout the device 100. In one embodiment of the present invention, the processors are Motorola processors, model number 86HC16, manufactured by Motorola, Inc of Schaumburg, Ill. Each of the processors is linked to a central controller via a general purpose communications controller disposed on each PCB. In one embodiment of the present invention the communications controller is an ARCNET communications controller, model COM20020, manufactured by Standard Microsystems Corporation of Hauppauge, N.Y. The communications controller enables the central controller to quickly and efficiently communicate with the various components linked to the PCBs.

According to one embodiment, two PCBs, a "motor board" and a "sensor board," are associated with each pair of lower output receptacles 106*c*-106*h*. The first two lower output receptacles 106*c,d*, the second two lower output receptacles 106*e,f*, and the last two lower output receptacles 106*g,h* are paired together. Each of the lower output receptacles 106 contain sensors that track the movement of the bills into the lower output receptacles 106*c*-106*h*, detect whether each storage cassette 118*a*-118*e* is positioned within the currency handling device 100, detect whether the doors 359 of the storage cassettes 118 are opened or closed, and whether the cassettes 118 are full. These aforementioned sensors associated with each pair of the lower output receptacles are tied into a sensor board which is linked to the central controller. The operation of the plunger assembly 300, the stacker wheels 202, the portion of transportation mechanism 104 disposed above the lower output receptacles 116*c*-116*h*, and the diverters 130 are controlled by processors disposed on the motor board associated with each pair of lower output receptacle's 106*c*-106*h* Those sensors 130 which track the movement of bills along the transportation mechanism 104 that are disposed directly above the lower output receptacles 106*c*-106*h* are also tied into the respective motor boards.

One of the four remaining PCBs is associated with the operation of the one or two stacker wheels 127 associated with the upper output receptacles 106*a,b*, the stripping wheels 140, the primary drive motor of the evaluation region 108, a diverter which direct bills to the two upper output receptacles 106*a,b*, and the diverter which then directs bills between the two upper output receptacles 106*a,b* The remaining three PCBs are associated with the operation of the transport mechanism 104 and a diverter which directs bills from the transport path to the bill facing mechanism 110. The plurality of sensors 130 disposed along the transport mechanism 104, used to track the movement of bills along the transport mechanism 104, also tied into these three remaining PCBs.

Figure 19:
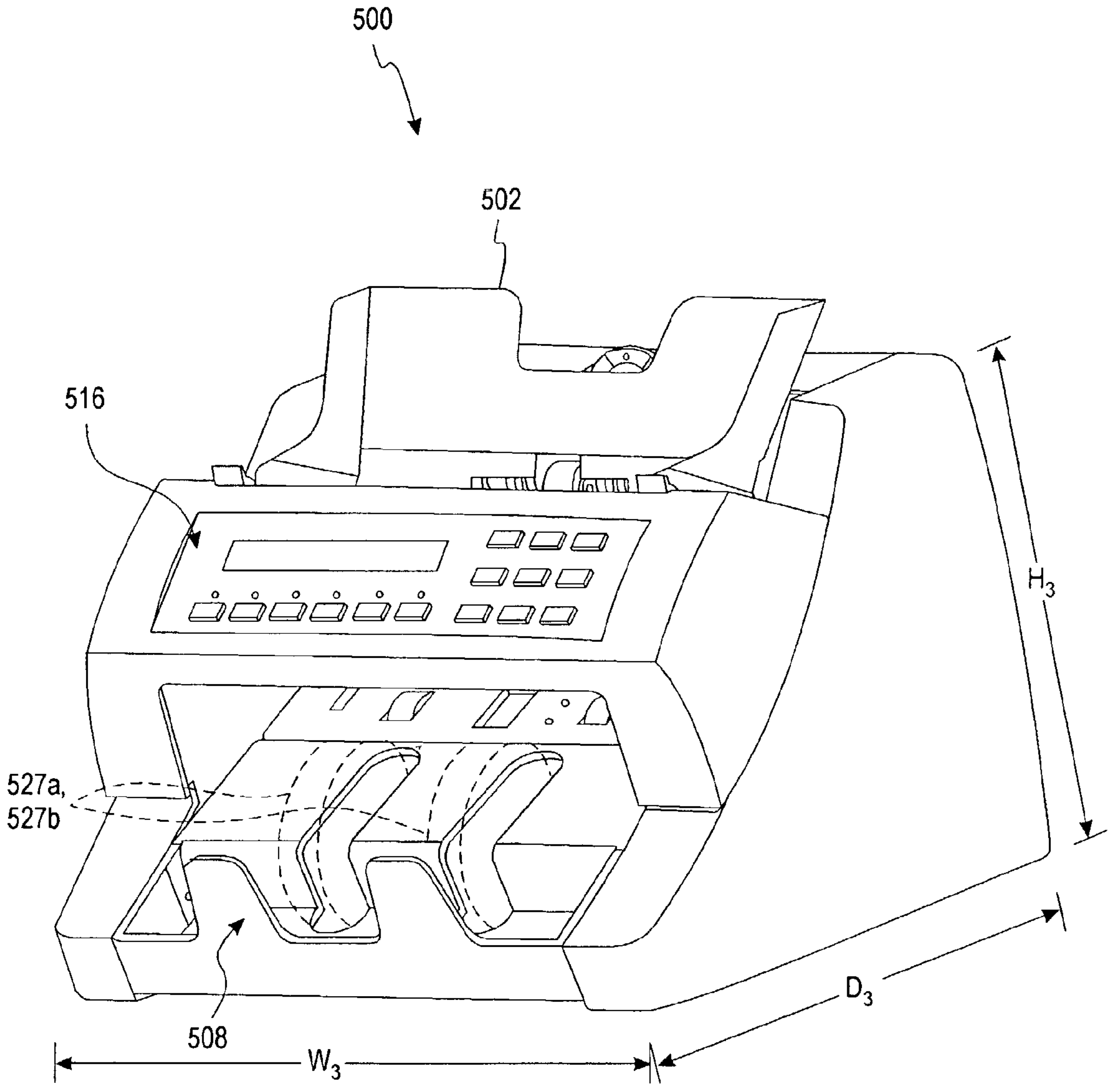
FIG. 19 is a perspective view of a compact document processing device having a single output receptacle according to one embodiment of the present invention.
Figure 20:
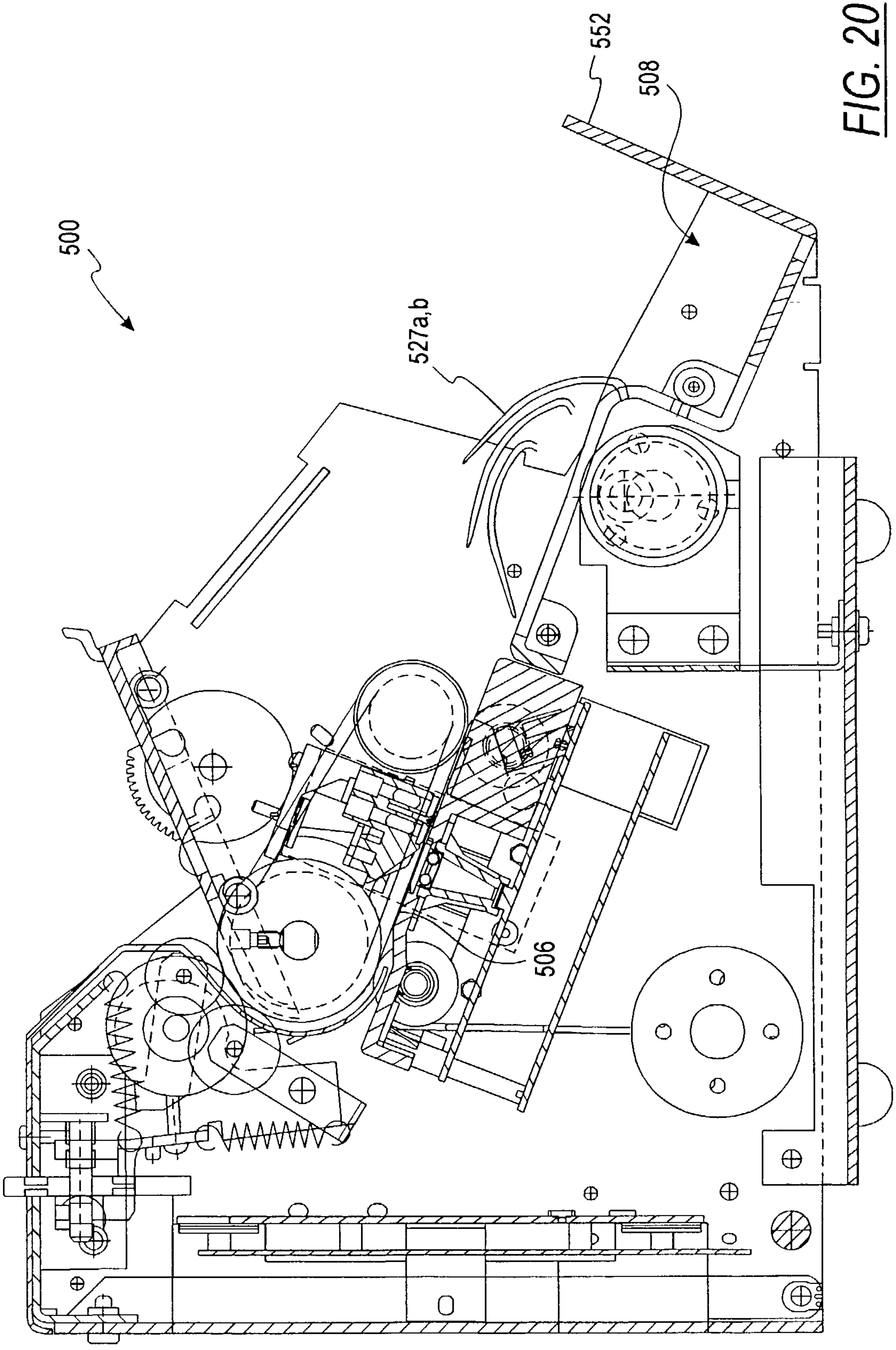
FIG. 20 is a side cross-sectional view of the device shown in FIG. 19.

Referring now to FIGS. 19 and 20, a currency processing device 500 having a single output receptacle is shown. The currency processing device 500 is capable of analyzing currency bills (e.g., scanning, processing, authenticating, denominating, etc.) in a manner similar to the multi-pocket document processing device 100 of FIGS. 1*a* and 1*b*. Documents are fed, one by one, from a stack of documents placed in an input receptacle 502 onto a transport mechanism The transport mechanism includes a transport plate or guide plate 506 for guiding a document to an output receptacle 508. Before reaching the output receptacle 508, the document can be, for example, evaluated, analyzed, counted and/or otherwise processed by an evaluation region of the device 500. In one embodiment of the device 500, documents are processed at a rate in excess of 600 documents per minute. In another embodiment, documents are processed at a rate in excess of 800 documents per minute. In yet another embodiment, documents are processed at a rate in excess of 1000 documents per minute. In another embodiment, documents are processed at a rate in excess of 1200 documents per minute. In still another embodiment, documents are processed at a rate in excess of 1500 documents per minute.

The device 500 in FIG. 19 has a touch panel display 516 according to one embodiment of the present invention which displays "functional" keys when appropriate. The touch panel display 516 simplifies the operation of the device 500. Alternatively or additionally, physical keys, switches, or buttons may be employed, such as, for example, a keypad. In one embodiment, the touch panel display 516 includes denomination keys, such as disclosed in commonly assigned U.S. Pat. No. 5,790,697, previously incorporated by reference.

A pair of driven stacking wheels 527*a* and 527*b* are located in the output receptacle 508 and come into contact with the documents as the documents are transported into the output receptacle 508. The stacking wheels 527*a,b* are supported for rotational movement about respective shafts journalled on a rigid frame and driven by a motor (not shown). Flexible blades of the stacker wheels 527*a* and 527*b* deliver the documents onto a forward end of a stacker plate 552 shown in FIG. 20.

According to one embodiment, the document scanning device 500 is compact, having a height ($H_3$) of about 9½ to 10½ inches, width ($W_3$) of about 10¾ to 11¾ inches, and a depth ($D_3$) of about 12 to 16 inches.

The device 500 shown and described in connection with FIGS. 19 and 20 is adapted to flag a bill triggering an error condition by, for example, presenting that bill in the output receptacle 508 and halting or suspending operation. An operator of the device 500 may specify via the touch panel display 516 the location of the document triggering an error condition. For example, the operator may specify that it be the last document to be delivered to, "presented," in the output receptacle 508 before operation is halted or suspended. In an embodiment in which the device 500 includes denomination keys, the operator may select one of the denomination keys after inspection of a no call bill or a suspect bill, and resume operation as if the no call bill or suspect bill had not been flagged.

Further details of the mechanical and operational aspects of the currency handling device having a single output receptacle 500 shown in FIGS. 19 and 20 are disclosed in U.S. Pat. No. 5,815,592, which is incorporated herein by reference in its entirety.

Figure 21:
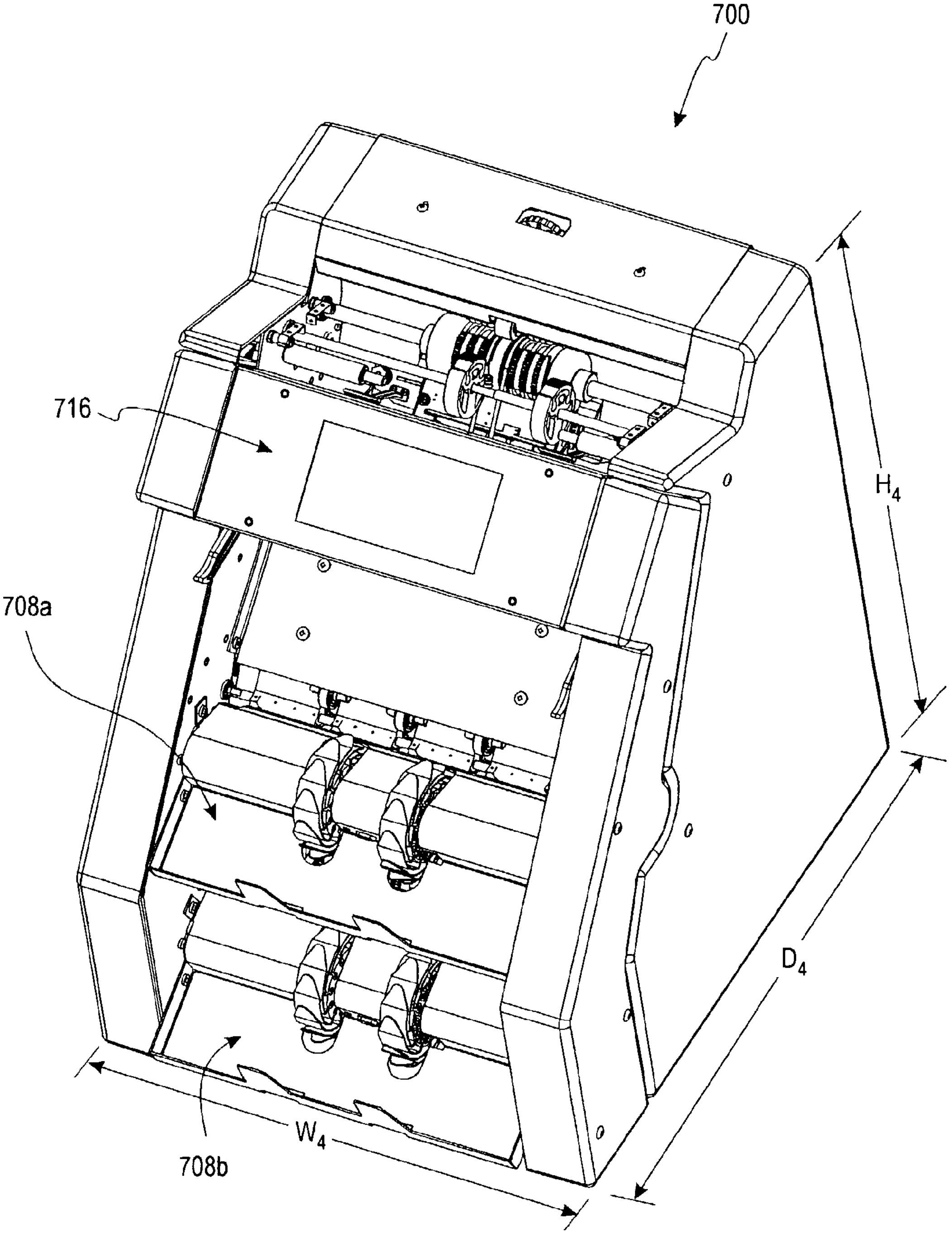
FIG. 21 is a perspective view of a compact document processing device having dual output receptacles according to one embodiment of the present invention.
Figure 22:
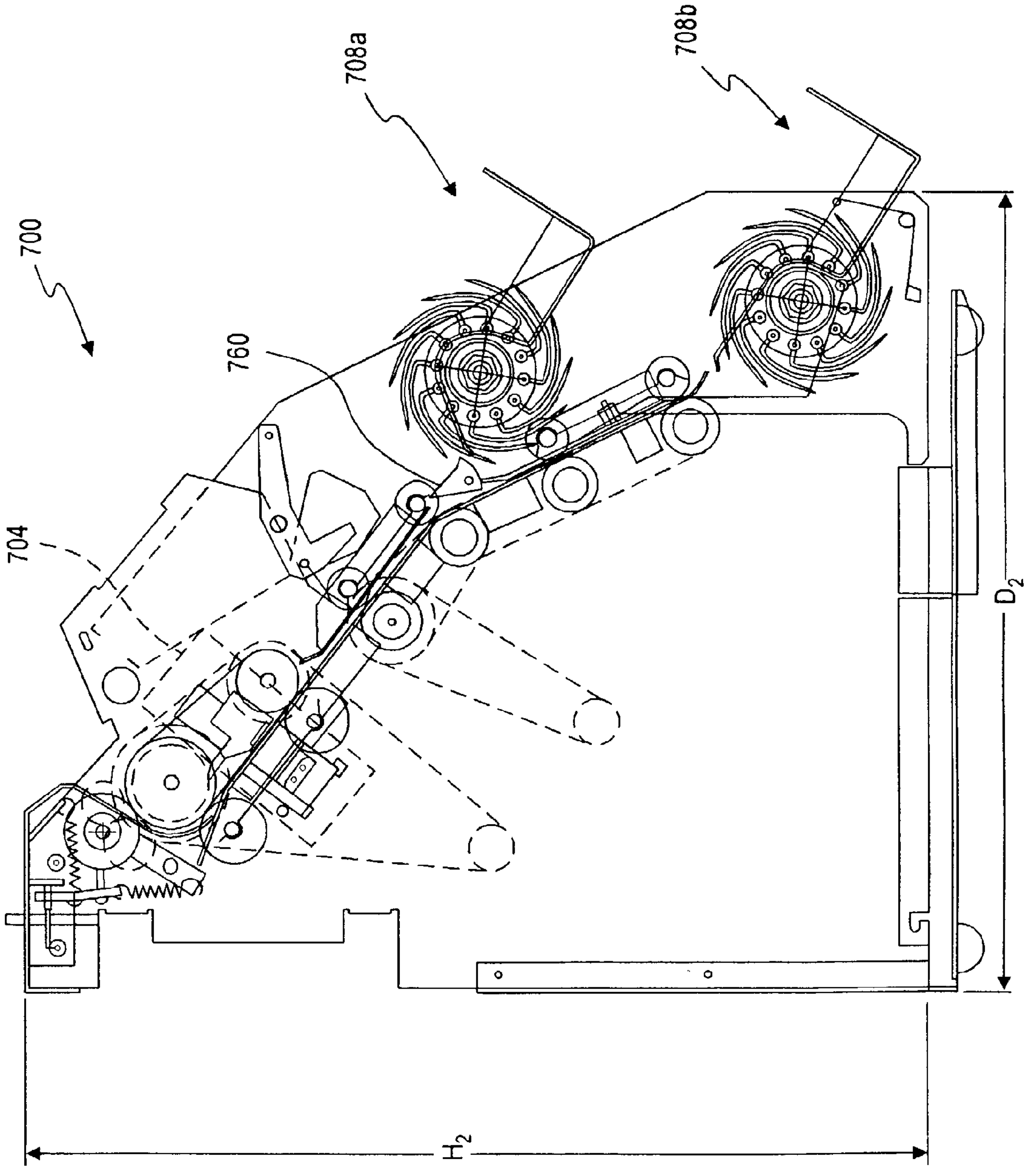
FIG. 22 is a side cross-sectional view of the device shown in FIG. 21.

Referring now to FIGS. 21 and 22, a currency processing device 700 having two output receptacles 708*a,b* is shown. The process for carrying documents through the device 700 is similar to that described in connection with the currency handling device 500 having a single output receptacle shown in FIGS. 19 and 20, except that the device 700 has first and second output receptacles, 708*a*, 708*b*, respectively. A diverter 760, shown in FIG. 7*b*, directs the documents to either the first or second output receptacle 708*a*, 708*b* When the diverter 760 is in a lower position, documents are directed to the first output receptacle 708*a* When the diverter 760 is in an upper position, documents proceed in the direction of the second output receptacle 708*b* The device 700 includes an evaluation region 704 for evaluating/analyzing currency bills or other documents in a manner similar to that described in connection with the device of FIGS. 1*a* and 1*b*.

According to one embodiment the device 700 is compact having a height ($H_2$) of about 17½ inches, width ($W_4$) of about 13½ inches, and a depth ($D_4$) of about 15 inches. According to another embodiment, the device 700 has dimensions of: a height ($H_2$) of about 18 inches; a width ($W_4$) of about 13¾ inches, and a depth ($D_4$) of about 16 inches. The device 700 is compact so that it may be rested upon a tabletop, countertop, or desk.

The device 700 is instructed by an operator via a control unit 716, which may include a touch panel display or other suitable interface, to direct certain documents to one or the other of the first and second output receptacles 708*a*, 708*b* These modes may be pre-programmed or operator-defined For example, according to one embodiment, genuine currency bills are directed to the first output receptacle 708*a*, whereas bills flagged as non-genuine currency bills are directed to the second output receptacle 708*b* Alternatively, flagged bills can be presented in either of the two output receptacles 708*a,b* According to another embodiment, a first denomination of currency bills are directed to the first output receptacle 708*a*, all other denominations of currency bills are directed to the second output receptacle 708*b*, and the device 700 is programmed to halt or suspend operation when a bill flagged as non-genuine currency bill is detected by the evaluation region of the device 700. In one embodiment, the control unit 716 may include denomination keys, such as explained above.

Further details of the operational and mechanical aspects of the currency handling device having a two output receptacles 700 shown in FIGS. 21 and 22 are disclosed in U.S. Pat. No. 6,311,819, which is incorporated herein by reference in its entirety.

Figure 23:
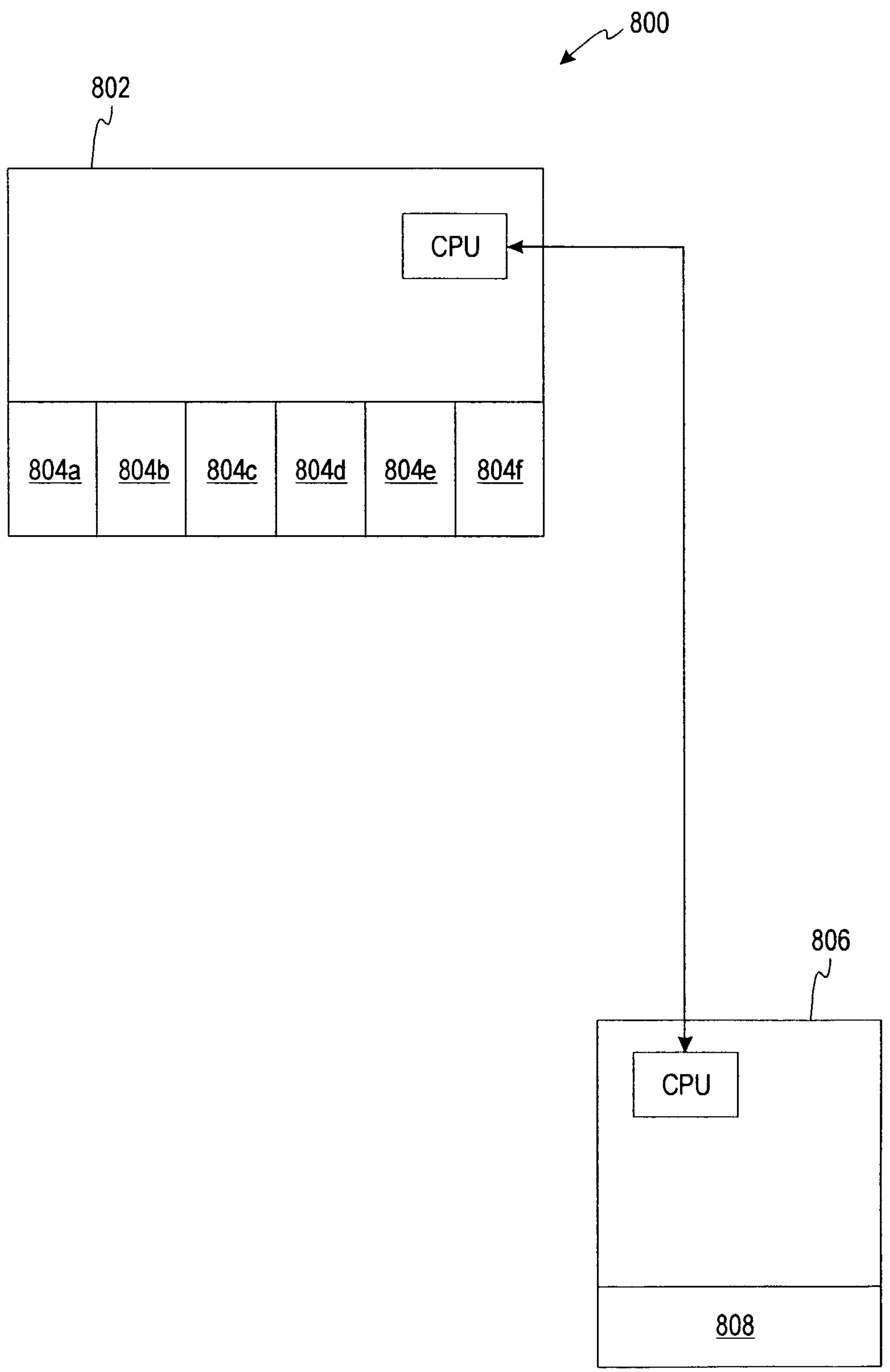
FIG. 23 is a functional block diagram of a multi-pocket currency processing device interfaced with a compact currency processing device.

Referring now to FIG. 23, according to another embodiment of the present invention, a cash processing system 800 includes a currency handling device 802 such as the multi-pocket device 100 (FIG. 1*a*) that is interfaced with a cash processing device. Cash processing devices include currency bill processing devices such as the single-pocket device or two-pocket device illustrated in FIGS. 19-22 and coin handling devices such as the coin counter/sorter of FIG. 24. In the embodiment illustrated in FIG. 23, the currency handling device 802 having a plurality of output receptacles 804*a-f* is interfaced to a compact currency handling device 806 having a single output receptacle 808. The integrated cash processing system 800 forms an efficient currency processing system. In various alternative embodiments, the currency bill processing device can include a currency bill processing device having more than two output receptacles. This interface between the multi-pocket device 802 and the compact currency handling device 806 allows for simultaneous processing of currency on both devices. All currency totals, units, and values from the compact device 806 are transferred to the multi-pocket device 802 automatically when the currency is removed from the compact device 806, or upon depression of a specific key on the interface of the compact device 806.

This tandem process of running currency on both devices (i.e., the multi-pocket device 802 and the compact device 806) allows for the "rejected" currency bill from the multi-pocket device 802 to be processed on the compact device 806 while the multi-pocket device 802 continues to process currency. Alternatively, the "rejected" currency from the multi-pocket device 802 is processed on the compact device 806 after the multi-pocket device 802 has stopped and prior to ending a batch or sub-batch. Currency totals from bills processed on the compact device 806 may also be entered manually by the operator on the multi-pocket device 802 on a "Manual Currency Entry" screen which is displayed in the user interface 120 (FIG. 1*a*).

When the Manual Currency Entry screen is displayed on the multi-pocket device's user interface 120, the totals transferred from the compact device 806 will populate the Manual Currency Entry screen denomination fields automatically. The number of bills of each denomination processed by the compact device 806 is transferred to the Manual Currency Entry screen of the multi-pocket device 120. For example, if the compact device processes ten $20 bills, the number "10" appears in the field of the Manual Currency Entry Screen in the $20 field. If a different screen is displayed on the multi-pocket device's user interface 120, the totals transferred from the compact device 806 will be added to the Manual Currency denomination field totals in the "background". Therefore, it is not required that the Manual Currency Entry screen be visible on the multi-pocket device's user interface 120 in order to transfer totals If the operator recalls the Manual Currency Entry screen, then they would see the totals previously transferred from the multi-pocket device's user interface 120 on the screen The totals transferred by the multi-pocket device 802's user interface 120 may or may not be cleared by the operator Additional manual currency may or may not be added manually by the operator.

Since manual entries by operators is a source of errors due to data entry mis-keying, this interface provides a means of adding additional currency totals to the multi-pocket device 802 without entering them in by hand, thus reducing errors. According to one embodiment, the currency bill bills that are be processed using the compact device 806 are those currency bills that were initially rejected and off-sorted by the multi-pocket device 802 for any reason (e.g., no call, chain, double, skew). This currency would otherwise have to be re-processed through the multi-pocket device 802 or manually entered and reconciled. Upon completion of re-processing the rejected notes, the information (e.g., denomination or whether an authentication test was satisfied) concerning the re-processed bills is transferred to the multi-pocket device 802 either automatically or upon selection of a key on a user interface of the multi-pocket device 802 to of the compact device 806. Alternatively, the information is transferred in real time.

According to one embodiment of the system 800, the operational speed (bill per minute) of the compact device 806 may be lowered, the evaluation criteria may be relaxed, additional evaluation tests may be performed, or a combination thereof so that a more complete evaluation of the bills is performed by the compact device 806. For example, the multi-pocket device 802 may have rejected a bill because the denomination of the bill could not be identified due to the bill being soiled. The denomination of that same bill may be identified by the compact device 806 having relaxed evaluation criteria (e.g., a certain percentage match less than that required by the evaluation of the multi-pocket device 802). In embodiments, where the compact device has two output receptacles, the bills not rejected by the compact device are routed to a first output receptacle while bills rejected again are routed to the second output receptacle.

Alternatively, operators may also choose to use the compact device 806 as an extension of the multi-pocket device 802. Put another way, the operator may choose to process some currency on the multi-pocket device 802 and simultaneously run additional currency on the compact device 806. Such operation is advantageous in an application where some of the currency is mixed and some is sorted. For example, the operator may have a batch to process whereby the currency consists of mixed notes and a large bundle of one or more denominations. The operator could process the mixed notes through the multi-pocket device 802 for sorting into the pockets 804*a-f* and run the other denomination(s) on the compact device 806. Additionally, the compact device 806 may be instructed to halt or suspend operation every 100 bills or other predetermined number (e.g., a strap limit), allowing the operator to also strap at the same time. In embodiments, where the compact device 806 has two output receptacles, a predetermined number of bills are routed to the first pocket and then the second prior to the compact device 806 suspending operation.

In other alternative embodiments of the interfaced system 800, the multi-pocket device 802, the compact device 806, or both are adapted to process currency bills and substitute currency media. Substitute currency media include documents which are redeemable for cash, goods, or services. Casino cashout tickets are an example of substitute currency media Casino cashout tickets are generated by gaming machines (e.g., a slot machine or video pocket machine) when a player of a gaming machine ends play with a positive balance. Those cashout tickets can be inserted into other gaming machine for credit, inserted into redemption machine for cash, or exchanged for cash at a casino teller's station. Casino promotional coupons are another type of substitute currency media. The promotional coupons are typically distributed in fixed denominations (e.g., $5 coupon, $10 coupon, etc.) by casinos for promotional proposes. Coupons can also be inserted into gaming machines for credit Additionally, gaming machine receive currency bills for credit resulting in a mixed batch of currency bills, casino tickets, and casino coupons from each gaming machine. Typically, the casino cashout tickets and casino coupon are machine readable via one or more bar code numbers printed thereon. The multi-pocket device 802 and compact device 806 include bar code readers for reading the bar code number(s) disposed on the casino tickets and coupons. Document processing devices that can process currency bills and substitute currency media are described copending U.S. patent application Ser. No. 10/205,144, entitled "System and Method for Processing Currency Bills and Documents Bearing Barcodes in a Document Processing Device," which was filed on Jul. 23, 2002 and is incorporated herein by reference in its entirety.

According to one embodiment of the present invention, the multi-pocket device 802 recognizes and off-sorts casino tickets to one of its reject pockets and processes the commingled currency bills into its other plurality of output receptacles The operator uses the compact device 806 to process the casino tickets. The information concerning the tickets, including ticket number, ticket amount, or both, determined by the compact device 806 is transferred from compact device 806 to the multi-pocket device 802. The multi-pocket device 802 stores the information concerning the processed cash and tickets together in a memory of the device. The multi-pocket device 802 is used to process the non-currency bill documents in alternative embodiments of the present invention and the compact device 802 is used to process the cash Such an embodiment is useful where the number of casino tickets, for example, greatly exceed the number currency bills.

Figure 24:
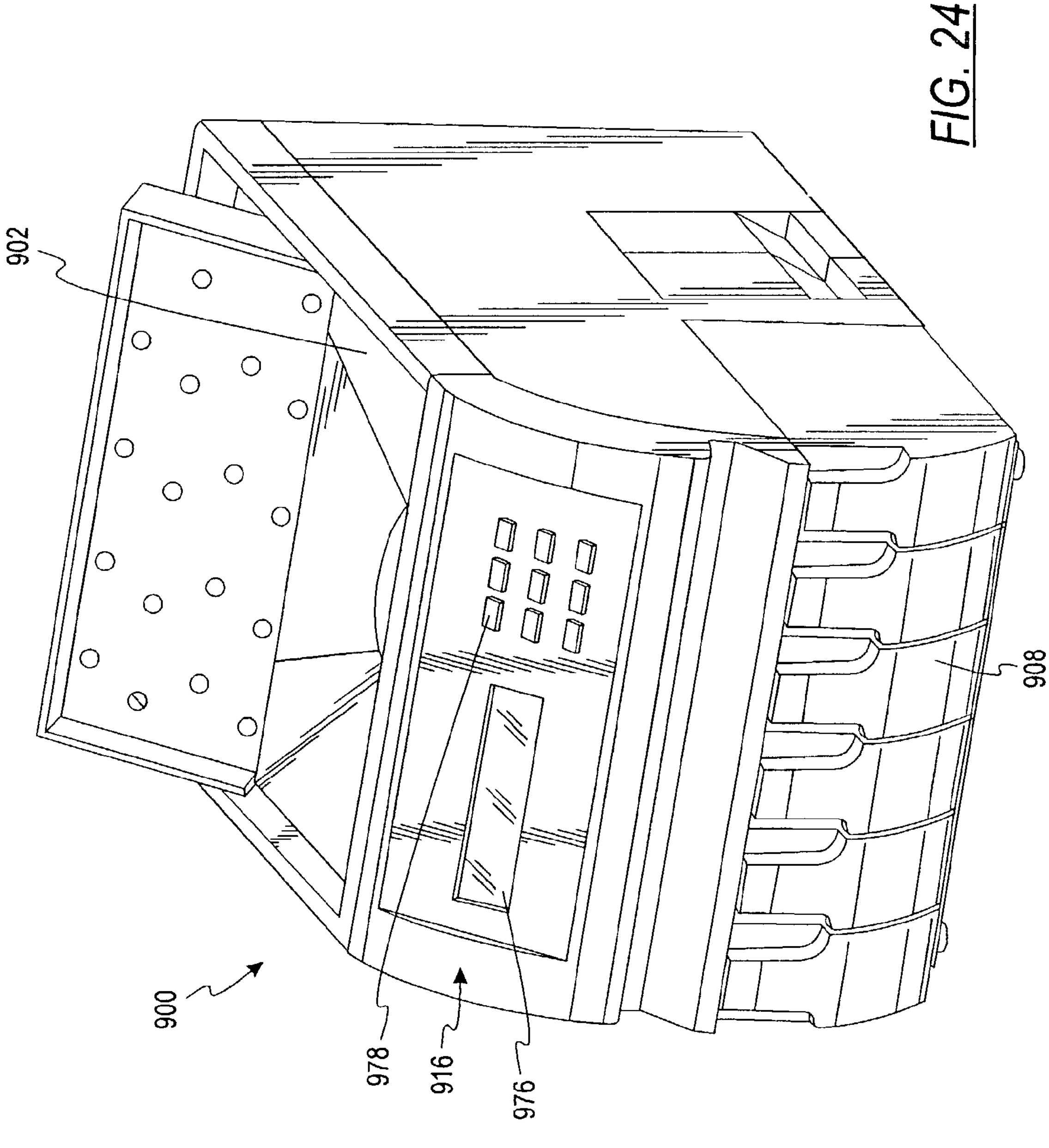
FIG. 24 is a perspective view of a coin sorter according to one embodiment of the present invention.

Referring now to FIG. 24, a coin sorter 900 is shown. The coin sorter system 900 includes a coin tray 902 which receives coins of mixed denominations. The term "coins" not only encompasses government-issued coins but also include casino tokens or other types of tokens. The coins are sorted, counted, and are captured in a plurality of coin bins 908. In an alternate embodiment, the coins are captured in a plurality of coin bags (not shown). The coin sorter system 900 includes a control panel 916. In the illustrated embodiment, the control panel 916 includes a display 976 for displaying information about the coin sorter system 900 and a plurality of keys 9078 for allowing the operator to enter information to the coin sorter system 900. In an alternate embodiment, the control panel 916 includes a touch screen. Additional details concerning the coin sorter system 900 are disclosed in U.S. Pat. Nos. 6,139,418 and 5,997,395, both entitled "High Speed Coin Sorter Having a Reduced Size," each of which is herein incorporated by reference in its entirety.

Figure 25:
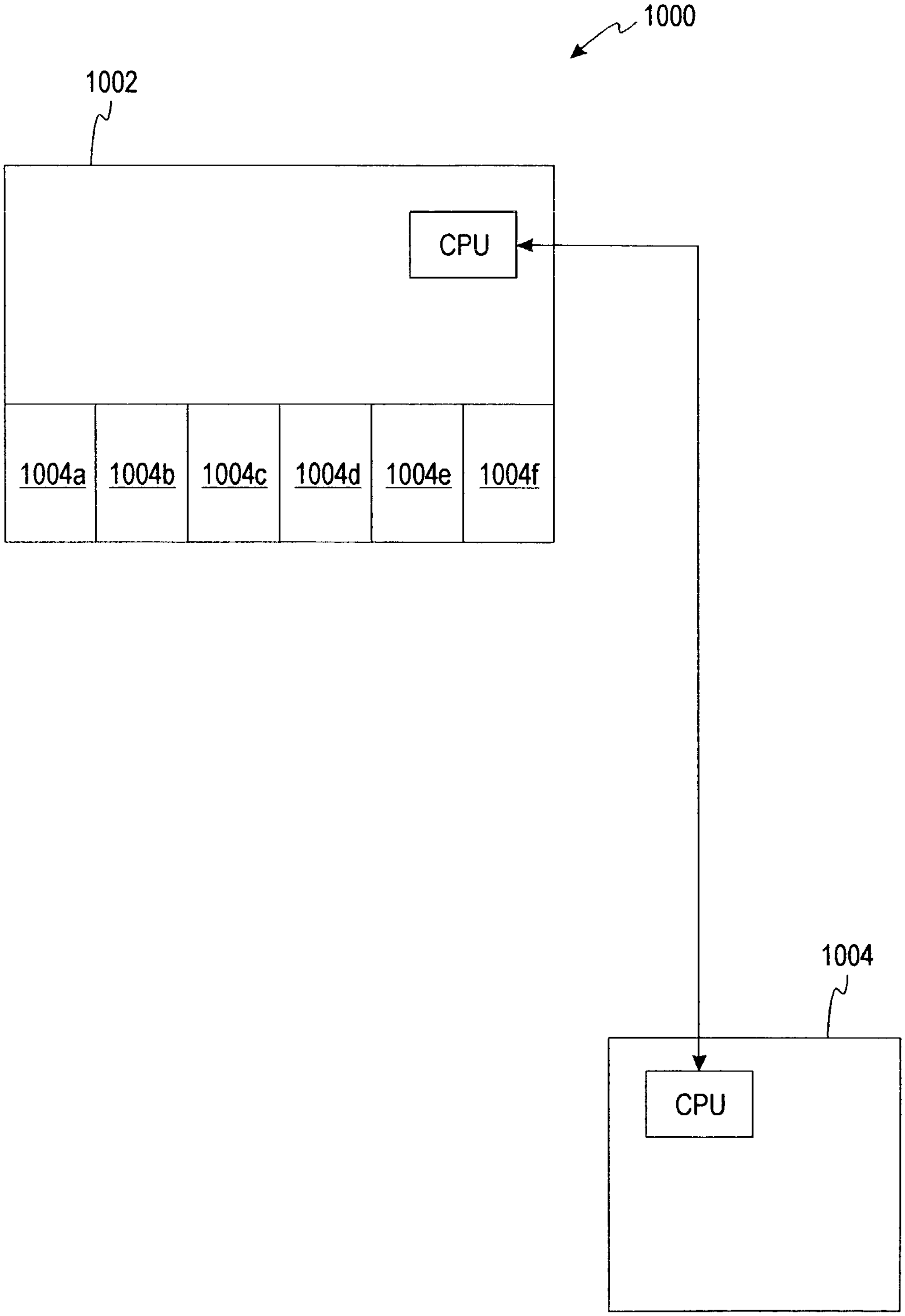
FIG. 25 is a functional block diagram showing a multi-pocket currency processing device interfaced with a compact currency processing device.

Referring also to FIG. 25, a cash processing system 100 including a currency processing device 1002 having a plurality of output receptacles 1004 such as the multi-pocket device 100 shown in FIG. 1*a* is communicatively interfaced with a coin sorter 1006 such as the coin sorter 900 shown in FIG. 24. The coin sorter system 900 shown in FIG. 24 is modified to include a communications port for communication with other devices or systems such as the multi-pocket device 1002. The coin sorter system 9000 may be further modified to perform the coin sorting and authenticating functions disclosed in U.S. Pat. Nos. 5,299,977, 5,453,047, 5,507,379, 5,542,880, 5,865,673 and 5,997,395, each of which is herein incorporated by reference in its entirety.

The coin sorter 9000 is used in connection with the multi-pocket device 1002 in a manner similar to the compact currency bill processing device 806. In such an embodiment, coin totals (i e, total amount/value of coins) determined by the coin sorter 900 can be added to the cash total determined by the multi-pocket device 1002. Such a device would be useful in a casino or banking environment, for example, where large quantities of both currency bills and coins (including casino tokens) need to be processed. For example, it may be desirable to determine the bill and coin totals received from various stations in a casino or to verify each deposit (which may include bill and coins deposits) at a bank.

In another alternative embodiment, both the coin sorter 1004 and a compact currency bill device 806 are interfaced to the MPS 100. Such an embodiment may be useful in casino operation wherein there are both large amount of currency bills to be processed as well as coins and tokens The compact currency processed device may be used to process the rejected bills, casino tickets and coupons, or combination thereof.

In addition to the embodiments described above or in the accompanying claims, several embodiments of the present invention will not be described.

Alternative Embodiment A1

A1. A currency processing system comprising a first currency bill processing device having a plurality of output receptacles, and a second currency bill processing device having a single output receptacle, the second currency bill processing device being communicatively interfaced with the first currency bill processing device.

Alternative Embodiment A2

A2. A currency processing system comprising a first currency bill processing device having a plurality of output receptacles; and a second currency bill processing device having two output receptacles, the second currency bill processing device being communicatively interfaced with the first currency bill processing device.

Alternative Embodiment A3

A3. A currency processing system comprising:

a first currency bill processing device having a plurality of output receptacles, and a second currency bill processing device having at least one output receptacle, the second currency bill processing device being communicatively interfaced with the first currency bill processing device.

Alternative Embodiment A4

A4. A currency processing system comprising a first currency bill processing device having a plurality of output receptacles, a second currency bill processing device having at least one output receptacle, the second currency bill processing device being communicatively interfaced with the first bill currency bill processing device; and a coin processing device being communicatively interface interfaced with the first bill currency bill processing device.

Alternative Embodiment A5

A5. A currency processing system comprising a first currency bill processing device having a plurality of output receptacles, the first currency bill processing device being adapted to determine information concerning each of the bills including determining the denomination of each of the bills, the first currency bill processing device being adapted to reject currency bills failing to meet a predetermined criteria, and a second currency bill processing device having at least one output receptacle, the second currency bill processing device being communicatively interfaced with the first currency bill processing device, the second currency device being adapted to process at least a portion of the currency bills rejected by the first currency bill processing device, the second currency bill processing device being adapted to determine information including concerning each of the bills.

Alternative Embodiment A6

A6. A currency processing system comprising a first currency bill processing device having a plurality of output receptacles, the first currency bill processing device being adapted to determine information concerning each of the bills including determining the denomination of each of the bills, the first currency bill processing device being adapted to reject currency bills failing to meet a predetermined criteria, the first currency bill processing device being adapted to maintain a first count of the total value of the currency being for which the denomination has been determined by the first currency bill processing device; and a second currency bill processing device having at least one output receptacle, the second currency bill processing device being communicatively interfaced with the first currency bill processing device, the second currency device being adapted to process at least a portion of the currency bills rejected by the first currency bill processing device, the second currency bill processing device being adapted to determine information concerning each of the bills including the denomination of each of the bills, the second currency bill processing device being adapted to maintain a second count of the total value of the currency for which the denomination has been determined by the second currency bill processing device, the first currency bill processing device being adapted to add the second count to the first count.

Alternative Embodiment A7

A7. A currency processing system comprising a currency bill processing device having a plurality of output receptacles adapted to process currency bills, the currency bill processing device being adapted to determine information concerning each of the currency bills including determining the denomination of each of the bills, the currency bill processing device being adapted to reject currency bills failing to meet a predetermined criteria, the currency bill processing device being adapted to maintain a first count of the total value of the currency bills being processed for which the denomination has been determined by the currency bill processing device, and a coin processing device for sorting and counting coins of mixed denominations, the coin processing device being communicatively interfaced with the currency bill processing device, the coin processing device being adapted to maintain a second count of the total value of the coins counted by the coin processing device, the currency bill processing device being adapted to add the second count to the first count.

Alternative Embodiment A8

A8. A currency processing system comprising a first currency bill processing device having a plurality of output receptacles, the first currency bill processing device being adapted to determine information concerning each of the bills including determining the denomination of each of the bills, the first currency bill processing device being adapted to reject currency bills failing to meet a predetermined criteria, the first currency bill processing device being adapted to maintain a first count of the total value of each currency bill for which the denomination has been determined by the first currency bill processing device, a second currency processing bill device having at least one output receptacle, the second currency bill processing device being communicatively interfaced with the first currency bill processing device, the second currency bill processing device being adapted to process at least a portion of the currency bills rejected by the first currency bill processing device, the second currency bill processing device being adapted to determine information concerning each of the currency bills including the denomination of each of the currency bills, the second currency bill processing device being adapted to maintain a second count of the total value of the currency bill for which the denomination has been determined by the second currency bill processing device, the first currency bill processing device being adapted to add the second count to the first count, and a coin processing device for sorting and counting coins of mixed denominations, the coin processing device being communicatively interfaced with the first currency bill processing device, the coin processing device being adapted to maintain a third count of the total value of the coins counted by the coin processing device, the first currency bill processing device being adapted to add the third count to the first count.

While the invention is susceptible to various modifications and alternative forms, specific embodiments thereof have been shown by way of example in the drawings and herein described in detail It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A currency processing system comprising:

a first currency bill processing device having a plurality of output receptacles, the first currency bill processing device including an input receptacle adapted to receive bills to be processed and a transport mechanism adapted to transport the bills, one at a time, from the input receptacle past an evaluation unit to the plurality of output receptacles, the first currency bill processing device being adapted to determine information concerning each of the bills including determining the denomination of each of the bills, the first currency bill processing device being adapted to maintain a first count of the determined denominations of the processed bills;

a second currency bill processing device for processing currency bills having at least one output receptacle, the second currency bill processing device being communicatively interfaced with the first currency bill processing device, the second currency bill processing device having an input receptacle adapted to receive currency bills and a transport mechanism adapted to transport the bills, one at a time, from the input receptacle past an evaluation unit to the at least one output receptacle, the evaluation unit of the second currency bill processing device being adapted to determine information concerning each of the bills including the denomination of each of the bills, the second currency bill processing device being adapted to maintain a second count of the determined denominations of the currency bills processed by the second currency processing device, the first currency bill processing device being adapted to receive the second count from the second currency processing device;

wherein the second currency bill processing device is adapted to process bills previously processed by the first device; and wherein the first currency processing device is adapted to receive substitute currency media and currency bills and is adapted to off-sort substitute currency media from currency bills, the second currency processing device being adapted to processes the substitute currency media off-sorted by the first currency processing device and to determine information concerning the processed substitute currency media, the first currency processing device being adapted to receive the information concerning the processed substitute currency media from the second currency processing device.

2. The system of claim 1 wherein the second currency bill processing device has a single output receptacle.

3. The system of claim 1 wherein the second currency bill processing device has two output receptacles.

4. The system of claim 1 wherein the currency bills processed by the first currency processing device and the currency bills processed by the second currency processing device are currency bills from the same batch of currency bills.

5. The system of claim 1 wherein the first currency processing device is adapted to flag those bills for which the first currency processing device cannot determine the denomination, the currency bills processed by the second currency processing device being those bills flagged by the first currency processing device.

6. The system of claim 1 wherein the first currency processing device is adapted to flag those bills failing to meet a predetermined criteria, the currency bills processed by the second currency processing device being those bills flagged by the first currency processing device.

7. The system of claim 1 wherein the first count of the determined denominations comprises a total value of the bills whose denomination has been determined and the second count of the determined denominations comprises a total value of bills whose denomination is determined by the second currency processing device.

8. The system of claim 7 wherein the second currency bill processing device includes an operator interface, and the second count of the determined denominations includes denominations for bills processed by the second currency processing device that have been manually entered via the operator interface.

9. The system of claim 1 wherein the first count of the determined denominations comprises the number of bills of each denomination determined by the first currency processing device and the second count of the determined denominations comprises the number of bills of each denomination determined by the second currency processing device.

10. The system of claim 9 wherein the second count of the determined denominations includes one or more manually entered bill denomination number manually entered.

11. The system of claim 1 wherein the first currency processing device includes an operator interface for receiving input from an operator of the currency processing system, the first currency bill processing device receiving the second count from the second currency bill processing device upon receipt of operator input.

12. The system of claim 1 wherein the first currency bill processing device receives the second count upon processing the currency bills with the second currency processing device.

13. The system of claim 1 further comprising a coin sorter communicatively interfaced with the first currency processing system, the coin sorter being adapted to sort and count coins of mixed denominations, the sorter being adapted to maintain a third count of the coins counted by the coin sorter, the first currency processing device being adapted to receive the third count from the coin sorter.

14. A currency processing system comprising:

a first currency bill processing device having a plurality of output receptacles, the first currency bill processing device including an input receptacle adapted to receive currency bills to be processed and a transport mechanism adapted to transport the bills, one at a time, from the input receptacle past an evaluation unit to the plurality of output receptacles, the first currency bill processing device being adapted to determine information concerning each of the bills including determining the denomination of each of the bills, the first currency bill processing device being adapted to maintain a first count of the determined denominations of the processed bills;

a coin sorter communicatively interfaced with the first currency processing device, the coin sorter being adapted to sort and count coins of mixed denominations, the coin sorter being adapted to maintain a count of the coins counted by the coin sorter, the first currency processing device being adapted to receive the count of the coins from the coin sorter;

a second currency bill processing device for processing currency bills having at least one output receptacle, the second currency bill processing device being communicatively interfaced with the first currency bill processing device, the second currency bill processing device having an input receptacle adapted to receive currency bills and a transport mechanism adapted to transport the bills, one at a time, from the input receptacle past an evaluation unit to the at least one output receptacle, the evaluation unit of the second currency bill processing device being adapted to determine information concerning each of the bills including the denomination of each of the bills, the second currency bill processing device being adapted to maintain a second count of the determined denominations of the currency bills processed by the second currency processing device, the first currency bill processing device being adapted to receive the second count from the second currency processing device;

wherein one or more of the currency bills processed by the first currency processing device comprise the currency bills processed by the second currency processing device; and wherein the first currency processing device is adapted to receive substitute currency media and currency bills and is adapted to off-sort substitute currency media from currency bills, the second currency processing device being adapted to processes the substitute currency media off-sorted by the first currency processing device and to determine information concerning the processed substitute currency media, the first currency processing device being adapted to receive the information concerning the processed substitute currency media from the second currency processing device.

15. The system of claim 14 wherein the currency bills processed by the first currency processing machine and the coins processed by the coin sorter are received from a single batch of currency bills and coins.

16. The system of claim 15 wherein the batch comprises currency bills and coins received from a gaming machine.

17. The system of claim 14 wherein the first currency processing device includes an operator interface for receiving input from an operator of the system, the first currency bill processing device receiving the count of coins from the coin sorter upon receipt of operator input.

18. The system of claim 14 wherein the first currency bill processing device automatically receives the count of coins from the coin sorter.

19. The system of claim 14 wherein the second currency bill processing device has a single output receptacle.

20. The system of claim 14 wherein the second currency bill processing device has two output receptacles.

21. The system of claim 14 wherein the currency bills processed by the first currency processing device and the currency bills processed by the second currency processing device are currency bills from the same batch of currency bills.

22. The system of claim 14 wherein the first currency processing device is adapted to flag those bills for which the first currency processing device cannot determine the denomination, the currency bills processed by the second currency processing device being those bills flagged by the first currency processing device.

23. A currency processing system comprising:

a first currency bill processing device having a plurality of output receptacles, the first currency bill processing device including an input receptacle adapted to receive a stack of bills of mixed denomination to be processed and a transport mechanism adapted to transport the bills, one at a time, from the input receptacle past one or more sensors to the plurality of output receptacles, the first currency bill processing device being adapted to determine information concerning at least some of the bills including determining the denomination of at least some of the bills including determining the denomination of bills of a plurality of denominations, the first currency bill processing device being adapted to maintain a first count of the determined denominations of the processed bills;

a second currency bill processing device for processing currency bills having at least one output receptacle, the second currency bill processing device being communicatively interfaced with the first currency bill processing device, the second currency bill processing device having an input receptacle adapted to receive a stack of currency bills of mixed denominations and a transport mechanism adapted to transport the bills, one at a time, from the input receptacle past one or more sensors to the at least one output receptacle, the second currency bill processing device being adapted to determine information concerning each of the bills including the denomination of at least some of the bills including determining the denomination of bills of a plurality of denominations, the second currency bill processing device being adapted to maintain a second count of the determined denominations of the currency bills processed by the second currency processing device, the first currency bill processing device being adapted to receive the second count from the second currency processing device;

wherein one or more of the currency bills processed by the first currency processing device comprise currency bills processed by the second currency processing device; and wherein the first currency processing device is adapted to receive substitute currency media and currency bills and is adapted to off-sort substitute currency media from currency bills, the second currency processing device being adapted to processes the substitute currency media off-sorted by the first currency processing device and to determine information concerning the processed substitute currency media, the first currency processing device being adapted to receive the information concerning the processed substitute currency media from the second currency processing device.

24. The system of claim 23 wherein the second currency bill processing device has a single output receptacle.

25. The system of claim 23 wherein the second currency bill processing device has two output receptacles.

26. The system of claim 23 wherein the currency bills processed by the first currency processing device and the currency bills processed by the second currency processing device are currency bills from the same batch of currency bills.

27. The system of claim 23 wherein the first currency processing device is adapted to flag those bills for which the first currency processing device cannot determine the denomination, the currency bills processed by the second currency processing device being those bills flagged by the first currency processing device.

28. The system of claim 23 wherein the first currency processing device is adapted to flag those bills failing to meet a predetermined criteria, the currency bills processed by the second currency processing device being those bills flagged by the first currency processing device.

29. A currency processing system comprising:

a first currency bill processing device having a plurality of output receptacles, the first currency bill processing device including an input receptacle adapted to receive substitute currency media and currency bills to be processed and a transport mechanism adapted to transport the substitute currency media and currency bills, one at a time, from the input receptacle past one or more sensors to the plurality of output receptacles, the first currency bill processing device being adapted to determine information concerning at least some of the currency bills including determining the denomination of at least some of the bills, the first currency bill processing device being adapted to off-sort the substitute currency media from the currency bills, the first currency bill processing device being adapted to maintain a first count of the determined denominations of the processed currency bills; and a second substitute currency media processing device for processing substitute currency media having at least one output receptacle, the second substitute currency media processing device being communicatively interfaced with the first currency bill processing device, the second substitute currency media processing device having an input receptacle adapted to receive the substitute currency media off-sorted by the first currency bill processing device, and a transport mechanism adapted to transport the substitute currency media, one at a time, from the input receptacle past one or more sensors to the at least one output receptacle, the second substitute currency media processing device being adapted to determine information concerning each of the substitute currency media, the second substitute currency media processing device being adapted to maintain a second count of the determined information of the substitute currency media processed by the second substitute currency media processing device, the first currency bill processing device being adapted to receive the second count from the second substitute currency media processing device;

wherein one or more of the substitute currency media processed by the first currency processing device comprise substitute currency media processed by the second substitute currency media processing device.

30. The system of claim 29 wherein the second substitute currency media processing device has a single output receptacle.

31. The system of claim 29 wherein the second substitute currency media processing device has two output receptacles.

32. The system of claim 29 wherein the currency bills processed by the first currency processing device and the substitute currency media processed by the second currency processing device are from the same batch.

* * * * *

UNITED STATES PATENT AND TRADEMARK OFFICE

CERTIFICATE OF CORRECTION

PATENT NO. : 8,453,820 B2
APPLICATION NO. : 10/256818
DATED : June 4, 2013
INVENTOR(S) : Curtis W. Hallowell et al.

It is certified that error appears in the above-identified patent and that said Letters Patent is hereby corrected as shown below:

On the Title Page, Item (75) Inventors:

Please insert -- Cherrie L. Brown, Lombard, IL (US); Mark C. Munro, Park Ridge, IL (US) -- after "Robert J. Klein, Chicago, IL (US)."

Signed and Sealed this
First Day of October, 2013

Teresa Stanek Rea
*Deputy Director of the United States Patent and Trademark Office*